(12) United States Patent
Hinckley et al.

(10) Patent No.: US 8,707,174 B2
(45) Date of Patent: Apr. 22, 2014

(54) MULTI-SCREEN HOLD AND PAGE-FLIP GESTURE

(75) Inventors: Kenneth P. Hinckley, Redmond, WA (US); Koji Yatani, Toronto (CA)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 12/713,110

(22) Filed: Feb. 25, 2010

(65) Prior Publication Data

US 2011/0209057 A1 Aug. 25, 2011

(51) Int. Cl.
*G06F 3/033* (2013.01)
*G06F 3/048* (2013.01)

(52) U.S. Cl.
USPC ............ 715/702; 715/719; 715/810; 715/863

(58) Field of Classification Search
USPC .................................. 715/702, 776, 810, 863
See application file for complete search history.

(56) References Cited

U.S. PATENT DOCUMENTS

| | | | |
|---|---|---|---|
| 4,686,332 A | 8/1987 | Greanias et al. | |
| 4,843,538 A | 6/1989 | Lane et al. | |
| 5,231,578 A | 7/1993 | Levin et al. | |
| 5,237,647 A | 8/1993 | Roberts et al. | |
| 5,351,995 A * | 10/1994 | Booker .................. | 283/117 |
| 5,463,725 A | 10/1995 | Henckel et al. | |
| 5,491,783 A | 2/1996 | Douglas et al. | |
| 5,497,776 A | 3/1996 | Yamazaki et al. | |
| 5,511,148 A | 4/1996 | Wellner | |
| 5,555,369 A | 9/1996 | Menendez et al. | |
| 5,596,697 A | 1/1997 | Foster et al. | |
| 5,661,773 A | 8/1997 | Swerdloff et al. | |
| 5,664,128 A | 9/1997 | Bauer | |
| 5,694,150 A | 12/1997 | Sigona et al. | |
| 5,731,813 A | 3/1998 | O'Rourke et al. | |
| 5,761,485 A | 6/1998 | Munyan | |

(Continued)

FOREIGN PATENT DOCUMENTS

| CN | 1326564 | 12/2001 |
|---|---|---|
| CN | 1766824 | 5/2006 |

(Continued)

OTHER PUBLICATIONS

"Apple Unibody MacBook Pro #MB991LL/A 2.53 GHz Intel Core 2 Duo", Retrieved from: <http://www.themacstore.com/parts/show/c-nmb3-mb991ll_a> on Nov. 10, 2009, (2009),12 pages.

(Continued)

*Primary Examiner* — Amy Ng
*Assistant Examiner* — Meseker Takele
(74) *Attorney, Agent, or Firm* — Micah Goldsmith; Glen Johnson; Micky Minhas

(57) ABSTRACT

Embodiments of a multi-screen hold and page-flip gesture are described. In various embodiments, a hold input is recognized at a first screen of a multi-screen system, and the hold input is recognized when held to select a journal page that is displayed on the first screen. A motion input is recognized at a second screen of the multi-screen system, and the motion input is recognized while the hold input remains held in place. A hold and page-flip gesture can then be determined from the recognized hold and motion inputs, and the hold and page-flip gesture is effective to maintain the display of the journal page while one or more additional journal pages are flipped for display on the second screen.

20 Claims, 21 Drawing Sheets

(56) References Cited

U.S. PATENT DOCUMENTS

| | | |
|---|---|---|
| 5,817,019 A | 10/1998 | Kawashima |
| 5,821,930 A | 10/1998 | Hansen |
| 5,838,889 A * | 11/1998 | Booker ............... 345/649 |
| 5,898,434 A | 4/1999 | Small et al. |
| 5,969,720 A | 10/1999 | Lisle et al. |
| 6,037,937 A | 3/2000 | Beaton et al. |
| 6,061,061 A | 5/2000 | Conrad et al. |
| 6,072,476 A * | 6/2000 | Harada et al. ............. 345/204 |
| 6,097,392 A | 8/2000 | Leyerle |
| 6,115,724 A * | 9/2000 | Booker ............... 715/273 |
| 6,167,439 A | 12/2000 | Levine et al. |
| 6,239,798 B1 | 5/2001 | Ludolph et al. |
| 6,310,610 B1 | 10/2001 | Beaton et al. |
| 6,340,979 B1 | 1/2002 | Beaton et al. |
| 6,507,352 B1 | 1/2003 | Cohen et al. |
| 6,525,749 B1 | 2/2003 | Moran et al. |
| 6,545,669 B1 | 4/2003 | Kinawi et al. |
| 6,859,909 B1 | 2/2005 | Lerner et al. |
| 6,920,619 B1 | 7/2005 | Milekic |
| 7,454,717 B2 | 11/2008 | Hinckley et al. |
| 7,479,949 B2 | 1/2009 | Jobs |
| 7,506,269 B2 | 3/2009 | Lang |
| 7,532,196 B2 | 5/2009 | Hinckley |
| 7,636,071 B2 | 12/2009 | O'Gorman |
| 7,656,393 B2 | 2/2010 | King et al. |
| 7,676,767 B2 | 3/2010 | Hofmeister et al. |
| 7,760,187 B2 | 7/2010 | Kennedy |
| 7,821,780 B2 | 10/2010 | Choy |
| D631,043 S | 1/2011 | Kell |
| 7,956,847 B2 * | 6/2011 | Christie ............... 345/173 |
| 8,102,858 B1 | 1/2012 | Rahim et al. |
| 8,212,788 B2 | 7/2012 | Lam |
| 8,239,785 B2 | 8/2012 | Hinckley |
| 8,261,213 B2 | 9/2012 | Hinckley |
| 8,294,669 B2 | 10/2012 | Partridge et al. |
| 8,327,295 B2 | 12/2012 | Ikeda et al. |
| 8,473,870 B2 | 6/2013 | Hinckley et al. |
| 8,539,384 B2 | 9/2013 | Hinckley et al. |
| 2001/0012000 A1 | 8/2001 | Eberhard |
| 2001/0047263 A1 | 11/2001 | Smith et al. |
| 2002/0060701 A1 | 5/2002 | Naughton et al. |
| 2002/0097229 A1 | 7/2002 | Rose et al. |
| 2002/0101457 A1 | 8/2002 | Lang |
| 2002/0116421 A1 * | 8/2002 | Fox et al. ............... 707/526 |
| 2003/0098858 A1 | 5/2003 | Perski et al. |
| 2003/0179541 A1 | 9/2003 | Sullivan |
| 2003/0231219 A1 | 12/2003 | Leung |
| 2004/0236774 A1 | 11/2004 | Baird et al. |
| 2004/0255254 A1 | 12/2004 | Weingart et al. |
| 2005/0012723 A1 | 1/2005 | Pallakoff |
| 2005/0101864 A1 | 5/2005 | Zheng et al. |
| 2005/0129314 A1 | 6/2005 | Chen |
| 2005/0184973 A1 | 8/2005 | Lum et al. |
| 2005/0198592 A1 | 9/2005 | Keely, Jr. et al. |
| 2006/0001650 A1 | 1/2006 | Robbins et al. |
| 2006/0010371 A1 | 1/2006 | Shur et al. |
| 2006/0012580 A1 | 1/2006 | Perski et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0161870 A1 | 7/2006 | Hotelling et al. |
| 2006/0197750 A1 | 9/2006 | Kerr et al. |
| 2006/0238517 A1 | 10/2006 | King et al. |
| 2006/0238520 A1 | 10/2006 | Westerman et al. |
| 2006/0262188 A1 | 11/2006 | Elyada et al. |
| 2007/0075976 A1 | 4/2007 | Kun et al. |
| 2007/0097096 A1 | 5/2007 | Rosenberg |
| 2007/0106939 A1 | 5/2007 | Qassoudi |
| 2007/0120762 A1 | 5/2007 | O'Gorman |
| 2007/0168890 A1 | 7/2007 | Zhao et al. |
| 2007/0236468 A1 | 10/2007 | Tuli |
| 2007/0242056 A1 | 10/2007 | Engelhardt et al. |
| 2008/0001924 A1 | 1/2008 | de los Reyes et al. |
| 2008/0005703 A1 | 1/2008 | Radivojevic et al. |
| 2008/0036743 A1 | 2/2008 | Westerman |
| 2008/0040692 A1 | 2/2008 | Sunday et al. |
| 2008/0042978 A1 | 2/2008 | Perez-Noguera |
| 2008/0052945 A1 | 3/2008 | Matas et al. |
| 2008/0062141 A1 | 3/2008 | Chandhri |
| 2008/0065720 A1 | 3/2008 | Brodersen et al. |
| 2008/0082903 A1 | 4/2008 | McCurdy et al. |
| 2008/0084400 A1 | 4/2008 | Rosenberg |
| 2008/0164982 A1 | 7/2008 | Andrews et al. |
| 2008/0165141 A1 | 7/2008 | Christie |
| 2008/0165255 A1 | 7/2008 | Christie et al. |
| 2008/0168396 A1 | 7/2008 | Matas et al. |
| 2008/0211766 A1 | 9/2008 | Westerman et al. |
| 2008/0211778 A1 * | 9/2008 | Ording et al. ............. 345/173 |
| 2008/0229192 A1 | 9/2008 | Gear et al. |
| 2008/0249682 A1 | 10/2008 | Wisniewski et al. |
| 2008/0278455 A1 | 11/2008 | Atkins et al. |
| 2008/0303798 A1 | 12/2008 | Matsudate et al. |
| 2009/0033632 A1 | 2/2009 | Szolyga et al. |
| 2009/0054107 A1 | 2/2009 | Feland, III et al. |
| 2009/0058830 A1 | 3/2009 | Herz |
| 2009/0059730 A1 | 3/2009 | Lyons et al. |
| 2009/0077501 A1 | 3/2009 | Partridge et al. |
| 2009/0079699 A1 * | 3/2009 | Sun ............... 345/173 |
| 2009/0094562 A1 | 4/2009 | Jeong et al. |
| 2009/0096758 A1 | 4/2009 | Hotelling et al. |
| 2009/0117943 A1 | 5/2009 | Lee et al. |
| 2009/0128505 A1 | 5/2009 | Partridge et al. |
| 2009/0138830 A1 | 5/2009 | Borgaonkar et al. |
| 2009/0143141 A1 | 6/2009 | Wells et al. |
| 2009/0153438 A1 | 6/2009 | Miller et al. |
| 2009/0167696 A1 * | 7/2009 | Griffin ............... 345/169 |
| 2009/0193366 A1 | 7/2009 | Davidson |
| 2009/0249236 A1 | 10/2009 | Westerman et al. |
| 2009/0251432 A1 | 10/2009 | Wang et al. |
| 2009/0276701 A1 | 11/2009 | Nurmi |
| 2009/0282332 A1 | 11/2009 | Porat |
| 2009/0284478 A1 | 11/2009 | De la Torre Baltierra |
| 2009/0295753 A1 | 12/2009 | King et al. |
| 2009/0307589 A1 | 12/2009 | Inose et al. |
| 2009/0309846 A1 | 12/2009 | Trachtenberg et al. |
| 2009/0320070 A1 | 12/2009 | Inoguchi |
| 2009/0327975 A1 | 12/2009 | Stedman |
| 2010/0013768 A1 | 1/2010 | Leung |
| 2010/0016049 A1 | 1/2010 | Shirakawa et al. |
| 2010/0020025 A1 | 1/2010 | Lemort et al. |
| 2010/0045705 A1 | 2/2010 | Vertegaal et al. |
| 2010/0050076 A1 | 2/2010 | Roth |
| 2010/0053861 A1 | 3/2010 | Kim et al. |
| 2010/0066667 A1 | 3/2010 | MacDougall et al. |
| 2010/0079392 A1 | 4/2010 | Chiang et al. |
| 2010/0081475 A1 | 4/2010 | Chiang et al. |
| 2010/0083190 A1 | 4/2010 | Roberts et al. |
| 2010/0088641 A1 | 4/2010 | Choi |
| 2010/0090971 A1 | 4/2010 | Choi et al. |
| 2010/0097338 A1 | 4/2010 | Miyashita et al. |
| 2010/0105443 A1 | 4/2010 | Vaisanen |
| 2010/0107067 A1 | 4/2010 | Vaisanen |
| 2010/0115455 A1 | 5/2010 | Kim |
| 2010/0134415 A1 | 6/2010 | Iwase et al. |
| 2010/0137027 A1 | 6/2010 | Kim |
| 2010/0164878 A1 | 7/2010 | Bestle et al. |
| 2010/0164959 A1 | 7/2010 | Brown et al. |
| 2010/0188371 A1 | 7/2010 | Lowles et al. |
| 2010/0201634 A1 | 8/2010 | Coddington |
| 2010/0213040 A1 | 8/2010 | Yeh et al. |
| 2010/0217428 A1 | 8/2010 | Strong et al. |
| 2010/0241973 A1 | 9/2010 | Whiddett |
| 2010/0245263 A1 | 9/2010 | Parada, Jr. et al. |
| 2010/0251189 A1 | 9/2010 | Jaeger |
| 2010/0262928 A1 | 10/2010 | Abbott |
| 2010/0283748 A1 | 11/2010 | Hsieh et al. |
| 2010/0302712 A1 | 12/2010 | Wilairat |
| 2010/0313124 A1 | 12/2010 | Privault et al. |
| 2011/0018821 A1 | 1/2011 | Kii |

(56) References Cited

U.S. PATENT DOCUMENTS

| | | | |
|---|---|---|---|
| 2011/0050594 A1* | 3/2011 | Kim et al. ............... | 345/173 |
| 2011/0055729 A1 | 3/2011 | Mason et al. | |
| 2011/0055753 A1 | 3/2011 | Horodezky et al. | |
| 2011/0107220 A1 | 5/2011 | Perlman | |
| 2011/0115735 A1 | 5/2011 | Lev et al. | |
| 2011/0126094 A1 | 5/2011 | Horodezky et al. | |
| 2011/0143769 A1 | 6/2011 | Jones et al. | |
| 2011/0167336 A1 | 7/2011 | Aitken et al. | |
| 2011/0181524 A1 | 7/2011 | Hinckley | |
| 2011/0185299 A1 | 7/2011 | Hinckley | |
| 2011/0185300 A1 | 7/2011 | Hinckley | |
| 2011/0185318 A1 | 7/2011 | Hinckley | |
| 2011/0185320 A1 | 7/2011 | Hinckley | |
| 2011/0191704 A1 | 8/2011 | Hinckley | |
| 2011/0191718 A1 | 8/2011 | Hinckley | |
| 2011/0191719 A1 | 8/2011 | Hinckley | |
| 2011/0199386 A1 | 8/2011 | Dharwada et al. | |
| 2011/0205163 A1 | 8/2011 | Hinckley | |
| 2011/0209039 A1 | 8/2011 | Hinckley | |
| 2011/0209057 A1* | 8/2011 | Hinckley et al. ............... | 715/702 |
| 2011/0209058 A1 | 8/2011 | Hinckley | |
| 2011/0209088 A1 | 8/2011 | Hinckley | |
| 2011/0209089 A1* | 8/2011 | Hinckley et al. ............... | 715/810 |
| 2011/0209093 A1 | 8/2011 | Hinckley | |
| 2011/0209097 A1 | 8/2011 | Hinckley | |
| 2011/0209098 A1 | 8/2011 | Hinckley | |
| 2011/0209099 A1 | 8/2011 | Hinckley | |
| 2011/0209100 A1 | 8/2011 | Hinckley | |
| 2011/0209101 A1 | 8/2011 | Hinckley | |
| 2011/0209102 A1 | 8/2011 | Hinckley | |
| 2011/0209103 A1 | 8/2011 | Hinckley | |
| 2011/0209104 A1 | 8/2011 | Hinckley | |
| 2011/0231796 A1 | 9/2011 | Vigil | |
| 2011/0291964 A1 | 12/2011 | Chambers et al. | |
| 2012/0084705 A1* | 4/2012 | Lee et al. ............... | 715/776 |
| 2012/0096411 A1 | 4/2012 | Nash | |
| 2012/0236026 A1 | 9/2012 | Hinckley | |

FOREIGN PATENT DOCUMENTS

| | | |
|---|---|---|
| CN | 101432677 | 5/2009 |
| CN | 101627361 | 1/2010 |
| EP | 1942401 | 7/2008 |
| EP | 2148268 | 1/2010 |
| JP | 6282368 | 10/1994 |
| JP | 7281810 | 10/1995 |
| JP | 2001265523 | 9/2001 |
| JP | 2001290585 | 10/2001 |
| JP | 2008305087 | 12/2008 |
| JP | 2009097724 | 4/2009 |
| JP | 2010250465 | 11/2010 |
| KR | 20090013927 | 2/2009 |
| KR | 1020090088501 | 8/2009 |
| KR | 20090106755 | 10/2009 |
| WO | WO-9928812 | 1/1999 |
| WO | WO-2011106467 | 9/2011 |
| WO | WO-2011106468 | 9/2011 |

OTHER PUBLICATIONS

"Dell and Windows 7—The Wait is Over", Retrieved from: <http://content.dell.com/us/en/corp/d/press-releases/2009-10-22-Dell-and-Windows-7.aspx> on Nov. 10, 2009, (Oct. 22, 2009),2 pages.

"New MS Courier Leak Details Multi-Touch Interface", Retrieved from: <http://www.electronista.com/articles/09/11/04/courier.gestures.ui.explained/> on Nov. 10, 2009, (Nov. 4, 2009),9 pages.

Daniels, Martyn "Brave New World", Retrieved from: <http://bookseller-association.blogspot.com/2009_03_01_archive.html> on Nov. 10, 2009, (Mar. 31, 2009),54 pages.

Hinckley, Ken et al., "Codex: A Dual Screen Tablet Computer", *Conference on Human Factors in Computing Systems*, Available at <http://research.microsoft.com/en-us/um/people/kenh/codex-chi-2009-with-authors.pdf>,(2009),10 pages.

Hinckley, Ken et al., "Stitching: Pen Gestures that Span Multiple Displays", *CHI 2004*, Available at <http://www.cs.cornell.edu/~francois/Papers/2004-Hinckley-AVI04-Stitching>,(2004),pp. 1-8.

Krazit, Tom "Has Apple Found the Magic Touch?", Retrieved from: <http://news.cnet.com/8301-13579_3-9879471-37.html> on Nov. 10, 2009, (Feb. 26, 2008),2 pages.

"Final Office Action", U.S. Appl. No. 12/709,301, (Mar. 1, 2012),11 pages.

"Final Office Action", U.S. Appl. No. 12/709,348, (Feb. 17, 2012),13 pages.

"Final Office Action", U.S. Appl. No. 12/709,376, (Mar. 30, 2012),16 pages.

"Non-Final Office Action", U.S. Appl. No. 12/695,937, (Apr. 25, 2012),14 pages.

"Non-Final Office Action", U.S. Appl. No. 12/700,510, (Feb. 7, 2012),20 pages.

"Non-Final Office Action", U.S. Appl. No. 12/709,245, (Mar. 21, 2012),14 pages.

"Non-Final Office Action", U.S. Appl. No. 12/709,282, (Apr. 12, 2012),9 pages.

"Non-Final Office Action", U.S. Appl. No. 12/713,053, (Feb. 3, 2012),8 pages.

"Non-Final Office Action", U.S. Appl. No. 12/713,133, (Jan. 31, 2012),7 pages.

"Notice of Allowance", U.S. Appl. No. 12/695,064, (Mar. 28, 2012),12 pages.

"Notice of Allowance", U.S. Appl. No. 12/695,959, (Apr. 17, 2012),13 pages.

"PCT Search Report and Written Opinion", Application No. PCT/US2011/025132, (Oct. 26, 2011),10 pages.

"PCT Search Report and Written Opinion", Application No. PCT/US2011/025575, (Sep. 30, 2011),14 pages.

"PCT Search Report and Written Opinion", Application No. PCT/US2011/025971, (Oct. 31, 2011),15 pages.

"PCT Search Report and Written Opinion", Application No. PCT/US/2011025972, (Sep. 30, 2011),14 pages.

"PCT Search Report and Written Opinion", Application No. PCT/US2011/020412, (Aug. 31, 2011),9 pages.

"PCT Search Report and Written Opinion", Application No. PCT/US2011/020410, (Sep. 27, 2011),9 pages.

"PCT Search Report and Written Opinion", Application No. PCT/US2011/020417, (Oct. 20, 2011),8 pages.

Appleinsider, "Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, (Oct. 26, 2006), 10 pages.

Brandl, Peter et al., "Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories,(May 2008), 10 pages.

Elliott Matthew "First Dell, Then HP: What's Next for N-trig's Multitouch Screen Technology", Retrieved from: <http://news.cnet.com/8301-17938_105-10107886-1.html> on Nov. 11, 2009, (Nov. 25, 2008), 5 pages.

Emigh, Jacqueline "Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, (Sep. 15, 2009), 3 pages.

Gross, Mark D., "Stretch-A-Sketch: A Dynamic Diagrammer", *IEEE Symposium on Visual Languages*, Available at <http://depts.washington.edu/dmachine/PAPER/VL94/vl.html>, (Nov. 1994), 11 pages.

Minsky, Margaret R., "Manipulating Simulated Objects with Real-world Gestures Using a Force and Position Sensitive Screen", *Computer Graphics*, vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>,(Jul. 1984), pp. 195-203.

(56) References Cited

OTHER PUBLICATIONS

Olwal, Alex et al., "Rubbing and Tapping for Precise and Rapid Selection on Touch-Screen Displays", *Conference on Human Factors in Computing Systems*, Available at <http://www.csc.kth.se/~alx/projects/research/rubbing/olwal_rubbing_tapping_chi_2008.pdf>,(Apr. 2008), 10 pages.

Pierce, Jeffrey S., et al., "Toolspaces and Glances: Storing, Accessing, and Retrieving Objects in 3D Desktop Applications", *1999 Symposium on Interactive 3D Graphics*, Available at <http://delivery.acm.org/10.1145/310000/300545/p163-pierce.pdf?key1=300545&key2=8792497521&coll=GUIDE&dl=GUIDE&CFID=61004073&CFTOKEN=28819248>,(Apr. 1999), pp. 163-168.

Roth, Volker et al., "Bezel Swipe: Conflict-Free Scrolling and Multiple Selection on Mobile Touch Screen Devices", *CHI 2009*, Available at <http://www.volkerroth.com/download/Roth2009a.pdf>,(Apr. 2009), 4 pages.

Yee, Ka-Ping "Two-Handed Interaction on a Tablet Display", Retrieved from: <http://zesty.ca/tht/yee-tht-chi2004-short.pdf>, Conference on Human Factors in Computing Systems,(Apr. 2004), 4 pages.

"Final Office Action", U.S. Appl. No. 12/695,937, (Jul. 26, 2012), 13 pages.

"Final Office Action", U.S. Appl. No. 12/700,460, (Aug. 28, 2012), 26 pages.

"Final Office Action", U.S. Appl. No. 12/713,053, (Aug. 17, 2012), 10 pages.

"Final Office Action", U.S. Appl. No. 12/713,081, (May 9, 2012), 19 pages.

"Final Office Action", U.S. Appl. No. 12/713,113, (Jun. 4, 2012), 18 pages.

"Final Office Action", U.S. Appl. No. 12/713,127, (Jun. 6, 2012), 18 pages.

"Final Office Action", U.S. Appl. No. 12/713,130, (Jun. 29, 2012), 8 pages.

"Final Office Action", U.S. Appl. No. 12/713,133, (Jul. 2, 2012), 8 pages.

"Foreign Office Action", Chinese Application No. 201110046519.X, (Aug. 2, 2012), 12 pages.

"Foreign Office Action", Chinese Application No. 201110046529.3, (Aug. 16, 2012), 13 pages.

"Foreign Office Action", Chinese Application No. 201110050499.3, (Aug. 3, 2012), 8 pages.

"Foreign Office Action", Chinese Application No. 201110050508.9, (Aug. 3, 2012), 8 pages.

"Non-Final Office Action", U.S. Appl. No. 12/695,976, (Sep. 11, 2012), 8 pages.

"Non-Final Office Action", U.S. Appl. No. 12/700,357, (Jul. 2, 2012), 10 pages.

"Non-Final Office Action", U.S. Appl. No. 12/709,204, (May 10, 2012), 20 pages.

"Non-Final Office Action", U.S. Appl. No. 12/709,301, (Sep. 13, 2012), 13 pages.

"Non-Final Office Action", U.S. Appl. No. 12/709,348, (Aug. 2, 2012), 14 pages.

"Non-Final Office Action", U.S. Appl. No. 12/709,376, (Aug. 17, 2012), 17 pages.

"Non-Final Office Action", U.S. Appl. No. 12/713,096, (Jun. 6, 2012), 9 pages.

"Non-Final Office Action", U.S. Appl. No. 12/713,118, (Jun. 8, 2012), 7 pages.

"Final Office Action", U.S. Appl. No. 12/695,976, (Nov. 21, 2012), 10 pages.

"Final Office Action", U.S. Appl. No. 12/700,357, (Oct. 24, 2012), 13 pages.

"Final Office Action", U.S. Appl. No. 12/700,510, (Oct. 10, 2012), 23 pages.

"Final Office Action", U.S. Appl. No. 12/709,204, (Oct. 3, 2012), 24 pages.

"Final Office Action", U.S. Appl. No. 12/709,376, (Nov. 8, 2012), 20 pages.

"Final Office Action", U.S. Appl. No. 12/713,118, (Oct. 26, 2012), 10 pages.

"Foreign Office Action", Chinese Application No. 201110050499.3, (Nov. 27, 2012), 8 pages.

"Non-Final Office Action", U.S. Appl. No. 12/695,842, (Oct. 3, 2012), 16 pages.

"Non-Final Office Action", U.S. Appl. No. 12/713,053, (Nov. 23, 2012), 13 pages.

"Non-Final Office Action", U.S. Appl. No. 12/713,081, (Nov. 29, 2012), 9 pages.

"Supplementary European Search Report", European Patent Application No. 11747907.1, (Nov. 7, 2012), 3 pages.

"Supplementary European Search Report", European Patent Application No. 11748028.5, (Nov. 7, 2012), 3 pages.

"Supplementary European Search Report", European Patent Application No. 11748027.7, (Nov. 29, 2012), 3 pages.

"Final Office Action", U.S. Appl. No. 12/709,245, (Mar. 15, 2013), 16 pages.

"Final Office Action", U.S. Appl. No. 12/709,282, (Dec. 24, 2012), 11 pages.

"Final Office Action", U.S. Appl. No. 12/709,301, (Jan. 7, 2013), 14 pages.

"Final Office Action", U.S. Appl. No. 12/709,348, (Jan. 7, 2013), 15 pages.

"Final Office Action", U.S. Appl. No. 12/713,096, (Feb. 15, 2013), 7 pages.

"Foreign Office Action", Chinese Application No. 201110046519.X, (Mar. 19, 2013), 11 pages.

"Foreign Office Action", Chinese Application No. 201110046529.3, (Feb. 4, 2013), 8 pages.

"Foreign Office Action", Chinese Application No. 201110050508.9, (Mar. 7, 2013), 8 pages.

"Foreign Office Action", European Patent Application No. 11747907.1, (Jan. 28, 2013), 5 pages.

"Foreign Office Action", European Patent Application No. 11748027.7, (Jan. 18, 2013), 5 pages.

"Foreign Office Action", European Patent Application No. 11748026.9, (Jan. 16, 2013), 5 pages.

"Foreign Office Action", European Patent Application No. 11748029.3, (Jan. 16, 2013), 5 pages.

"Foreign Office Action", European Patent Application No. 11748028.5, (Jan. 28, 2013), 5 pages.

"Non-Final Office Action", U.S. Appl. No. 12/709,282, (Feb. 28, 2013), 11 pages.

"Non-Final Office Action", U.S. Appl. No. 12/713,130, (Jan. 16, 2013), 5 pages.

"Non-Final Office Action", U.S. Appl. No. 12/713,133, (Jan. 14, 2013), 8 pages.

"Non-Final Office Action", U.S. Appl. No. 13/484,075, (Jan. 15, 2013), 9 pages.

"Notice of Allowance", U.S. Appl. No. 12/713,130, (Feb. 19, 2013), 5 pages.

"Final Office Action", U.S. Appl. No. 12/472,699, (Jul. 29, 2013), 12 pages.

"Final Office Action", U.S. Appl. No. 12/472,699, (Feb. 15, 2012), 12 pages.

"Final Office Action", U.S. Appl. No. 12/709,282, (Jul. 16, 2013), 11 pages.

"Final Office Action", U.S. Appl. No. 12/713,133, (May 20, 2013), 10 pages.

"Final Office Action", U.S. Appl. No. 13/484,075, (May 21, 2013), 10 pages.

"Foreign Office Action", Chinese Application 201110044285.5, (Apr. 24, 2013), 8 pages.

"Foreign Office Action", Chinese Application 201110044285.5, (Jun. 20, 2012),12 pages.

"Foreign Office Action", Chinese Application No. 201110044285.5, (Jan. 4, 2013), 13 pages.

"Foreign Office Action", Chinese Application No. 201110046510.9, (May 31, 2013), 11 pages.

(56) References Cited

OTHER PUBLICATIONS

"Non-Final Office Action", U.S. Appl. No. 12/472,699, (Mar. 28, 2013),10 pages.
"Non-Final Office Action", U.S. Appl. No. 12/472,699, (Sep. 12, 2011),12 pages.
"Non-Final Office Action", U.S. Appl. No. 12/695,842, (May 22, 2013),16 pages.
"Non-Final Office Action", U.S. Appl. No. 12/709,204, (Jun. 6, 2013), 27 pages.
"Non-Final Office Action", U.S. Appl. No. 12/709,245, (May 30, 2013),15 pages.
"Non-Final Office Action", U.S. Appl. No. 12/709,301, (May 14, 2013),14 pages.
"Non-Final Office Action", U.S. Appl. No. 12/709,348, (Apr. 25, 2013),15 pages.
"Non-Final Office Action", U.S. Appl. No. 12/709,376, (May 23, 2013),17 pages.
"Non-Final Office Action", U.S. Appl. No. 12/713,096, (Jun. 26, 2013), 8 pages.
"Non-Final Office Action", U.S. Appl. No. 12/713,113, (Apr. 23, 2013),18 pages.
"Notice of Allowance", U.S. Appl. No. 12/713,053, (Jun. 7, 2013), 7 pages.
"UI Guidelines", Retrieved from: http://na.blackberry.com/eng/deliverables/6622/BlackBerry_Smartphones-US.pdf., 76 Pages.
Nordgren, Peder "Development of a Touch Screen Interface for Scania Interactor", *Master's Thesis in Computing Science, UMEA University*, Available at <http://www.cs.umu.se/education/examina/Rapporter/PederNordgren.pdf>,(Apr. 10, 2007), pp. 1-59.
Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.
"Foreign Office Action", Chinese Application No. 201110046529.3, (Aug. 6, 2013), 11 pages.
"Foreign Office Action", Chinese Application No. 201110046519.X, (Aug. 6, 2013), 11 pages.
"Final Office Action", U.S. Appl. No. 12/709,301, (Sep. 3, 2013),12 pages.
"Final Office Action", U.S. Appl. No. 12/709,376, (Sep. 10, 2013),12 pages.
"Final Office Action", U.S. Appl. No. 12/709,348, (Sep. 12, 2013),12 pages.
"Final Office Action", U.S. Appl. No. 12/709,204, (Sep. 12, 2013), 24 pages.
"Final Office Action", U.S. Appl. No. 12/713,113, (Oct. 8, 2013), 21 pages.
"Non-Final Office Action", U.S. Appl. No. 12/709,282, (Oct. 10, 2013),12 pages.
"Non-Final Office Action", U.S. Appl. No. 12/472,699, (Oct. 23, 2013),14 pages.
"Non-Final Office Action", U.S. Appl. No. 12/709,301, (Oct. 24, 2013),11 pages.
"Final Office Action", U.S. Appl. No. 12/709,245, (Jan. 6, 2012), 13 pages.
"iQuery & Css Example—Dropdown Menu", *DesignReviver*, Retrieved from: <http://designreviver.com/tutorials/jquery-css-example-dropdown-menu/> on Nov. 22, 2011, (Oct. 7, 2008), 30 pages.
"Non-Final Office Action", U.S. Appl. No. 12/700,460, (Jan. 13, 2012), 21 pages.
"Non-Final Office Action", U.S. Appl. No. 12/709,245, (Nov. 30, 2011), 11 pages.
"Non-Final Office Action", U.S. Appl. No. 12/709,301, (Nov. 28, 2011), 9 pages.
"Non-Final Office Action", U.S. Appl. No. 12/709,348, (Dec. 7, 2011), 12 pages.
"Non-Final Office Action", U.S. Appl. No. 12/709,376, (Jan. 23, 2012), 14 pages.
"Non-Final Office Action", U.S. Appl. No. 12/713,081, (Dec. 23, 2011), 18 pages.
"Non-Final Office Action", U.S. Appl. No. 12/713,113, (Dec. 22, 2011), 20 pages.
"Non-Final Office Action", U.S. Appl. No. 12/713,127, (Dec. 27, 2011), 22 pages.
"Non-Final Office Action", U.S. Appl. No. 12/713,130, (Jan. 23, 2012), 7 pages.
"PCT Search Report and Written Opinion", Application No. PCT/US2011/025131, (Oct. 31, 2011), 10 pages.
"PCT Search Report and Written Opinion", Application No. PCT/US2011/025974, (Oct. 26, 2011), 8 pages.
"PCT Search Report and Written Opinion", Application No. PCT/US2011/025973, (Oct. 27, 2011), 13 pages.
Vigil, Jose M., "Methods for Controlling a Floating Cursor on a Multi-touch Mobile Phone or Tablet in Conjunction with Selection Gestures and Content Gestures", U.S. Appl. No. 61/304,972, (Feb. 16, 2010), 54 pages.
"Foreign Office Action", CN Application No. 201110046510.9, Feb. 12, 2014, 9 Pages.
"Foreign Office Action", CN Application No. 201110050506.X, Feb. 26, 2014, 6 pages.
"Non-Final Office Action", U.S. Appl. No. 12/713,096, Jan. 30, 2014, 23 pages.
"Non-Final Office Action", U.S. Appl. No. 12/713,127, Jan. 31, 2014, 21 pages.
"Supplemental Notice of Allowance", U.S. Appl. No. 12/713,133, Feb. 3, 2014, 2 pages.
"Final Office Action", U.S. Appl. No. 12/695,842, Dec. 2, 2013, 17 pages.
"Advisory Action", U.S. Appl. No. 12/709,376, Dec. 19, 2013, 2 pages.
"Ex Parte Mewherter, PTAB precedential decision", U.S. Appl. No. 10/685,192, May 8, 2013, 22 pages.
"Non-Final Office Action", U.S. Appl. No. 12/709,204, Nov. 20, 2013, 31 pages.
"Notice of Allowance", U.S. Appl. No. 12/713,133, Jan. 17, 2014, 4 pages.
"Foreign Office Action", Chinese Application No. 201110050852.8, Nov. 1, 2013, 8 Pages.
"Non-Final Office Action", U.S. Appl. No. 12/713,133, Dec. 10, 2013, 8 pages.
"Non-Final Office Action", U.S. Appl. No. 12/709,348, Dec. 20, 2013, 9 pages.

\* cited by examiner

MULTI-SCREEN HOLD AND PAGE-FLIP GESTURE

BACKGROUND

Computing devices, such as personal computers, laptop computers, tabletop computers, entertainment devices, and the like increasingly offer more functions and features which can make it difficult for a user to navigate and select application commands that are relevant to a function the user wants to initiate on a device. The traditional techniques to interact with computing devices, such as a mouse, keyboard, and other input devices, may become less efficient as the functions and features of computing devices continues to increase. A challenge that continues to face designers of these devices is how to incorporate interaction techniques that are not only intuitive, but allow a user to easily and quickly interact with the many functions and features of a computing device.

SUMMARY

This summary is provided to introduce simplified concepts of multi-screen gestures. The simplified concepts are further described below in the Detailed Description. This summary is not intended to identify essential features of the claimed subject matter, nor is it intended for use in determining the scope of the claimed subject matter.

Embodiments of a multi-screen hold and page-flip gesture are described. In various embodiments, a hold input is recognized at a first screen of a multi-screen system, and the hold input is recognized when held to select a journal page that is displayed on the first screen. A motion input is recognized at a second screen of the multi-screen system, and the motion input is recognized while the hold input remains held in place. A hold and page-flip gesture can then be determined from the recognized hold and motion inputs, and the hold and page-flip gesture is effective to maintain the display of the journal page while one or more additional journal pages are flipped for display on the second screen. In other embodiments, the hold and page-flip gesture can be used to select the journal page that is displayed on the first screen and flip journal pages (optionally in a direction of the selected journal page) to display two additional journal pages, one each displayed on the first and second screens; maintain the display of the journal page that is displayed on the first screen and flip journal pages to display a different journal page on the second screen; and/or maintain the display of the journal page that is displayed on the first screen and flip journal pages to display a non-consecutive journal page on the second screen side-by-side with first journal page.

BRIEF DESCRIPTION OF THE DRAWINGS

Embodiments of multi-screen gestures are described with reference to the following drawings. The same numbers are used throughout the drawings to reference like features and components.

DETAILED DESCRIPTION

Figure 1:
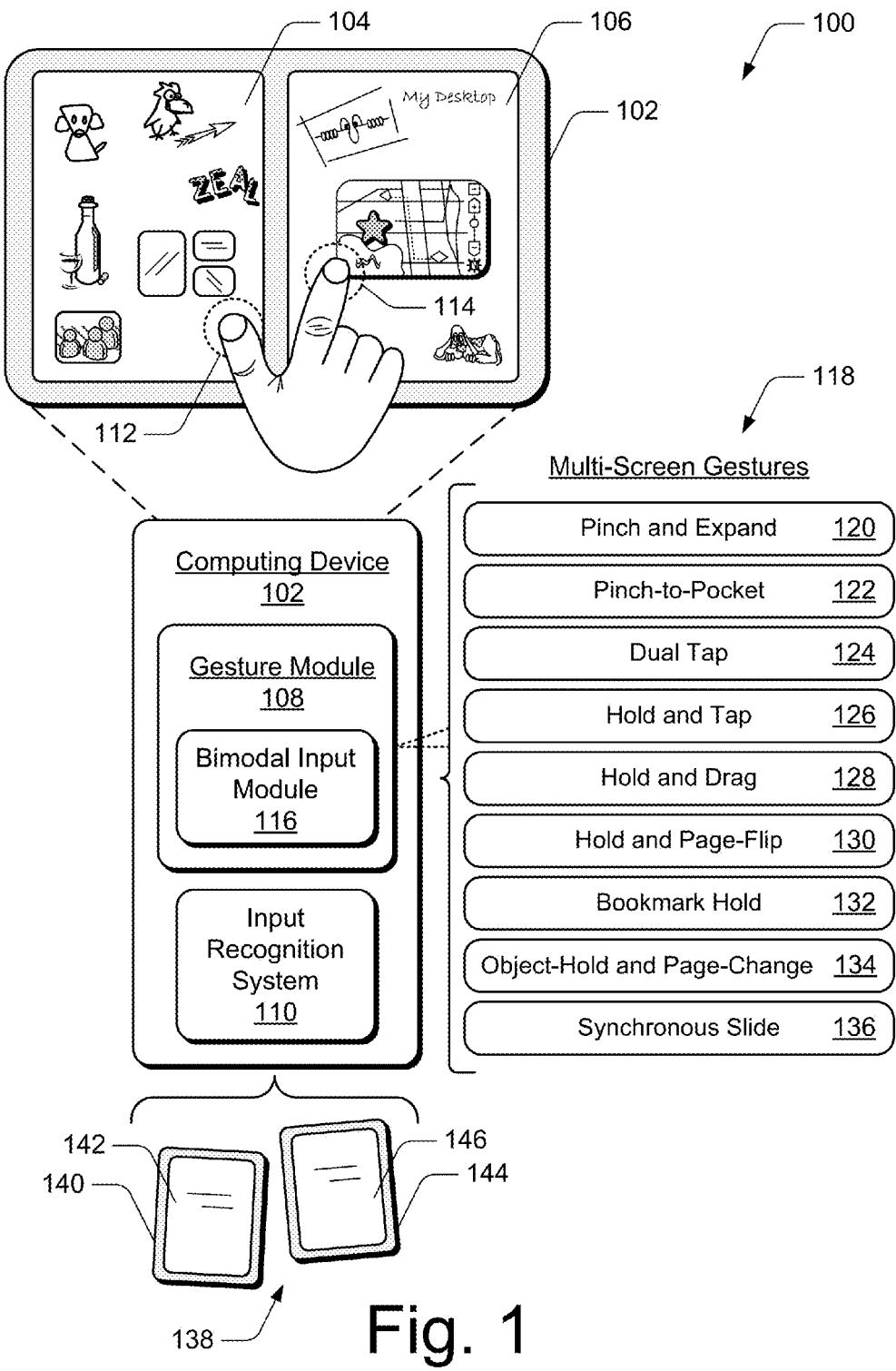
FIG. 1 illustrates an environment of a multi-screen system that can implement various embodiments of multi-screen gestures.

Embodiments of multi-screen gestures provide that a user of one or more computing devices in a multi-screen system can provide inputs at more than one screen of the system to initiate computing device functions. In various embodiments of multi-screen gestures, a multi-screen system includes two or more screens that may be implemented as independent devices, or integrated into a single, multi-screen device. A user can input any type of various inputs or combinations of inputs, such as select, hold, motion, touch, and/or tap inputs that are recognized at multiple screens of a multi-screen system or multi-screen device. A multi-screen gesture can then be recognized from a combination of the various inputs to initiate a computing device function. Accordingly, the multi-screen gestures provide that the user can provide the various inputs to a multi-screen system or device in an intuitive manner, rather than by conventional techniques used to input commands to a computer device.

In various embodiments, multi-screen gestures can be implemented by a computer device having multiple screens. Alternatively, multi-screen gestures can be implemented by a multi-screen system of two or more screens that may not be physically connected or integrated into a single device, but rather are communicatively linked such as via a data or network connection. A multi-screen system can include multiple, independent slate or handheld devices that may automatically discover one another, are explicitly paired by a user, or are otherwise positioned in temporary physical proximity.

In various embodiments of multi-screen gestures, a multi-screen pinch gesture can be used to condense a displayed object on multiple screens of a multi-screen system or device. Alternatively, a multi-screen expand gesture can be used to expand a displayed object for display on multiple screens of the multi-screen system or device. Multi-screen pinch and expand gestures may also semantically zoom through different levels of an information architecture associated with a display, object, and/or application. A multi-screen pinch-to-pocket gesture can be used to pocket a displayed object, such as to save the displayed object as a thumbnail image under a bezel of a multi-screen system or device.

A multi-screen dual tap gesture can be used to expand or pocket a displayed object that is displayed on multiple screens of a multi-screen system or device. For example, a displayed object can be expanded for full-screen display on first and second screens when a dual tap gesture is determined while the displayed object is pocketed. Alternatively, a displayed object can be pocketed when a dual tap gesture is determined while the displayed object is displayed full-screen on the first and second screens.

A multi-screen hold and tap gesture can be used to move and/or copy a displayed object from one displayed location to another, such as to move or copy an object onto a journal page, or incorporate the object into a notebook. A multi-screen hold and drag gesture can be used to maintain a display of a first part of a displayed object on one screen and drag a second part of the displayed object that is displayed on another screen to pocket the second part of the displayed object for a split-screen view. Alternatively, a hold and drag gesture can be used to maintain a display of a first part of the displayed object on one screen and drag a pocketed second part of the displayed object to expand the display on another screen.

A multi-screen hold and page-flip gesture can be used to select a journal page that is displayed on one screen and flip journal pages to display two additional or new journal pages, much like flipping pages in a book. The journal pages are flipped in a direction of the selected journal page to display the two new journal pages, much like flipping pages forward or backward in a book. Alternatively, a hold and page-flip gesture can be used to maintain the display of a journal page that is displayed on one screen and flip journal pages to display a different journal page on another screen. Non-consecutive journal pages can then be displayed side-by-side, which for a book, would involve tearing a page out of the book to place it in a non-consecutive page order to view it side-by-side with another page.

A multi-screen bookmark hold gesture can be used to bookmark a journal page at a location of a hold input to the journal page on a screen, and additional journal pages can be flipped for viewing while the bookmark is maintained for the journal page. A bookmark hold gesture mimics the action of a reader holding a thumb or finger between pages to save a place in a book while flipping through other pages of the book. Additionally, a bookmark is a selectable link back to the journal page, and a selection input of the bookmark flips back to display the journal page on the screen. A multi-screen object-hold and page-change gesture can be used to move and/or copy a displayed object from one display location to another, such as to incorporate a displayed object for display on a journal page. Additionally, a relative display position can be maintained when a displayed object is moved or copied from one display location to another.

A multi-screen synchronous slide gesture can be used to move a displayed object from one screen for display on another screen, replace displayed objects on the device screens with different displayed objects, move displayed objects to reveal a workspace on the device screens, and/or cycle through one or more workspaces (e.g., applications, interfaces, etc.) that are displayed on the system or device screens. A synchronous slide gesture may also be used to navigate to additional views, or reassign a current view to a different screen. Additionally, different applications or workspaces can be kept on a stack and cycled through, forward and back, with synchronous slide gestures.

While features and concepts of the described systems and methods for a multi-screen gestures can be implemented in any number of different environments, systems, and/or various configurations, embodiments of a multi-screen gestures are described in the context of the following example systems and environments.

FIG. 1 illustrates an environment 100 in an example implementation that is operable to employ multi-screen gesture techniques. The illustrated environment 100 includes an example of a computing device 102 that may be configured in a variety of ways, such as any type of multi-screen computer or device. For example, the computing device 102 may be configured as a computer (e.g., a laptop computer, notebook computer, tablet PC, tabletop computer, and so on), a mobile station, an entertainment appliance, a gaming device, and so forth as further described with reference to FIG. 2. The computing device 102 may also be implemented with software that causes the computing device 102 to perform one or more operations.

In this example environment 100, the computing device 102 is a multi-screen device that includes a first screen 104 and a second screen 106, which can each be implemented as any type of display device, display system, and/or touch-screen. The first and second screens can display any type of background or desktop, as well as user interfaces and various displayable objects (e.g., any type of pictures, images, graphics, text, notes, sketches, drawings, selectable controls, user interface elements, etc.). The first and second screens can also display journal pages, such as any type of notebook, periodical, book, paper, a single page, and the like in an electronic form.

The computing device 102 includes a gesture module 108 that is representative of functionality to determine gestures and cause operations to be performed that correspond to the gestures. The computing device also includes an input recognition system 110 implemented to recognize various inputs or combinations of inputs, such as a select input, hold input, motion input, touch input, tap input, and the like. The input recognition system 110 may include any type of input detection features to distinguish the various types of inputs, such as sensors, light sensing pixels, touch sensors, cameras, and/or a natural user interface that interprets user interactions, gestures, inputs, and motions. In implementations, the input recognition system 110 can detect motion inputs at the first or second screens from discernable variables, such as from a direction variable (e.g., right-to-left or vice-versa); from start region position variables (e.g., left1, top1, right1, bottom1) and end region position variables (e.g., left2, top2, right2, bottom2); and/or from a motion rate variable (e.g., a particular number of pixels per second).

The input recognition system 110 recognizes the various types of inputs, and the gesture module 108 identifies or determines a multi-screen gesture from the recognized inputs. For example, the input recognition system 110 can recognize a first input at the first screen 104, such as a touch input 112, and recognize a second input at the second screen 106, such as a select input 114. The gesture module 108 can then determine a type of multi-screen gesture from the recognized touch and select inputs. An input at the first or second screen may also be recognized as including attributes (e.g., movement, a selection point, etc.) that differentiate one type of input from another input as recognized by the input recognition system 110. This differentiation may then serve as a basis to identify or determine a motion input from a touch input, and consequently an operation that is to be performed based on a determination of the corresponding gesture. In implementations, the computing device 102 may include a gestures database that includes various determinable representations of gestures, inputs, and/or motions from which the gesture module 108 can determine or identify a multi-screen gesture.

The computing device 102 can also be implemented to recognize and differentiate between the various inputs, such as a touch input and a stylus input. The differentiation may be performed in a variety of ways, such as by recognizing the size of a finger input versus the size of a stylus input. Differentiation may also be performed through use of a camera to distinguish a touch input (e.g., holding up one or more fingers), a stylus input (e.g., holding two fingers together to indicate a point), or an input via a natural user interface (NUI). A variety of other techniques for distinguishing the various types of inputs are contemplated.

A variety of different types of inputs may be recognized by the input recognition system 110, and a variety of different gestures may be determined by the gesture module 108, such a gestures that are recognized as a single type of input as well as gestures involving multiple types of inputs. Accordingly, the gesture module 108 of computing device 102 may include a bimodal input module 116 that is representative of functionality to recognize inputs and identify or determine gestures involving bimodal inputs. The gesture module 108 may support a variety of different gesture techniques by recognizing and leveraging different types of inputs through use of the bimodal input module 116. For instance, the bimodal input module 116 may be configured to recognize a stylus as a writing tool, whereas touch is employed to manipulate objects displayed on the first or second screen. It should be noted that by differentiating between the various types of inputs, the number of gestures that are made possible by each of these inputs alone is also increased.

Accordingly, the gesture module 108 can support a variety of different multi-screen gestures 118, both bimodal and otherwise. Examples of the multi-screen gestures 118 described herein include pinch and expand gestures 120, a pinch-to-pocket gesture 122, a dual tap gesture 124, a hold and tap gesture 126, a hold and drag gesture 128, a hold and page-flip gesture 130, a bookmark hold gesture 132, an object-hold and page-change gesture 134, and a synchronous slide gesture 136. Each of these different multi-screen gestures is described in a corresponding section in the following discussion. Although each multi-screen gesture is described in a different section, it should be readily apparent that the features of these gestures may be combined and/or separated to support additional gestures. Therefore, the description is not limited to these examples. Additionally, although the following discussion may describe specific examples of select, hold, motion, touch, and tap inputs, the various types of inputs may be switched in different instances (e.g., a touch input may be used as a select input, and vice versa) and/or both inputs may be provided with the same input without departing from the spirit and scope thereof.

The illustrated environment 100 also includes an example of a multi-screen system 138 that includes two (or more) devices that each have a screen, such as a first device 140 that has a screen 142, and a second device 144 that has a screen 146. The screens are not physically connected or integrated into a single device, but rather are communicatively linked such as via a data or network connection. A multi-screen system can include multiple, independent slate or handheld devices that may automatically discover one another, are explicitly paired by a user, or are otherwise positioned in temporary physical proximity. In an implementation, a multi-screen system may also include a multi-screen device. The first device 140 and the second device 144 of the multi-screen system 138 can each be configured as described with reference to computing device 102 in any form of a computer (e.g., a laptop computer, notebook computer, tablet PC, tabletop computer, and so on), a mobile station, an entertainment appliance, a gaming device, and so forth.

Figure 2:
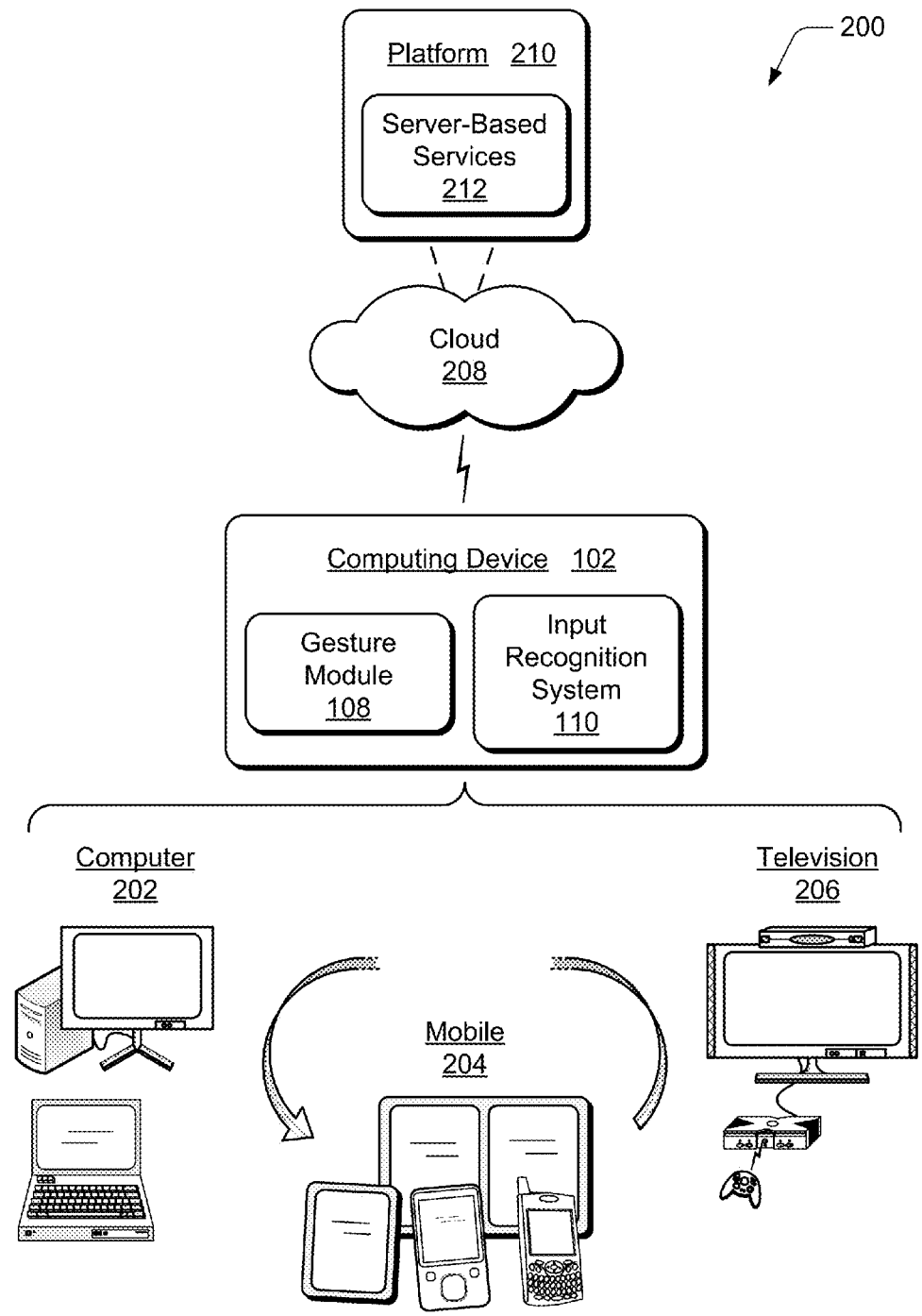
FIG. 2 illustrates an example system with multiple devices that can implement various embodiments of multi-screen gestures for a seamless user experience in ubiquitous environments.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen tabletop computer, laptop computer, netbook, and so on. The computing device 102 may also be implemented as the mobile 204 class of device that includes mobile devices, such as a mobile phone, portable music player, portable gaming device, a tablet computer, a multi-screen tablet computer, and so on. The computing device 102 may also be implemented as the television 206 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples of multi-screen gestures described in the following sections.

The cloud 208 includes and/or is representative of a platform 210 for server-based services 212. The platform 210 abstracts underlying functionality of hardware (e.g., servers) and software resources of the cloud 208. The server-based services 212 may include applications and/or data that can be utilized while all or most of the computer processing is executed on servers that are remote from the computing device 102. Server-based services can be provided as a service over the Internet and/or through a subscriber network, such as a cellular or WiFi network.

The platform 210 may abstract resources and functions to connect the computing device 102 with other computing devices. The platform 210 may also serve to abstract scaling of resources to provide a corresponding level of scale to encountered demand for the server-based services 212 that are implemented via the platform 210. Accordingly, in an interconnected device embodiment, implementation of functionality of the gesture module 108 may be distributed throughout the system 200. For example, the gesture module 108 may be implemented in part on the computing device 102 as well as via the platform 210 that abstracts the functionality of the cloud 208.

Further, the functionality may be supported by the computing device 102 in any one or more of the configurations. For example, the multi-screen gesture techniques supported by the gesture module 108 and the input recognition system 110 may be recognized using track pad functionality in the computer 202 configuration, touch-screen functionality in the mobile 204 configuration, and/or recognized by a camera as part of a natural user interface (NUI) that does not involve contact with a specific input device in the television 206 configuration. Further, performance of the operations to detect and recognize the inputs to identify or determine a particular multi-screen gesture may be distributed throughout the system 200, such as by the computing device 102 and/or the server-based services 212 supported by the platform 210 of the cloud 208.

In addition to the following sections that describe the various multi-screen gestures, example methods are also described with reference to respective figures in accordance with various embodiments of multi-screen gestures. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Multi-Screen Pinch and Expand Gestures

Figure 3:
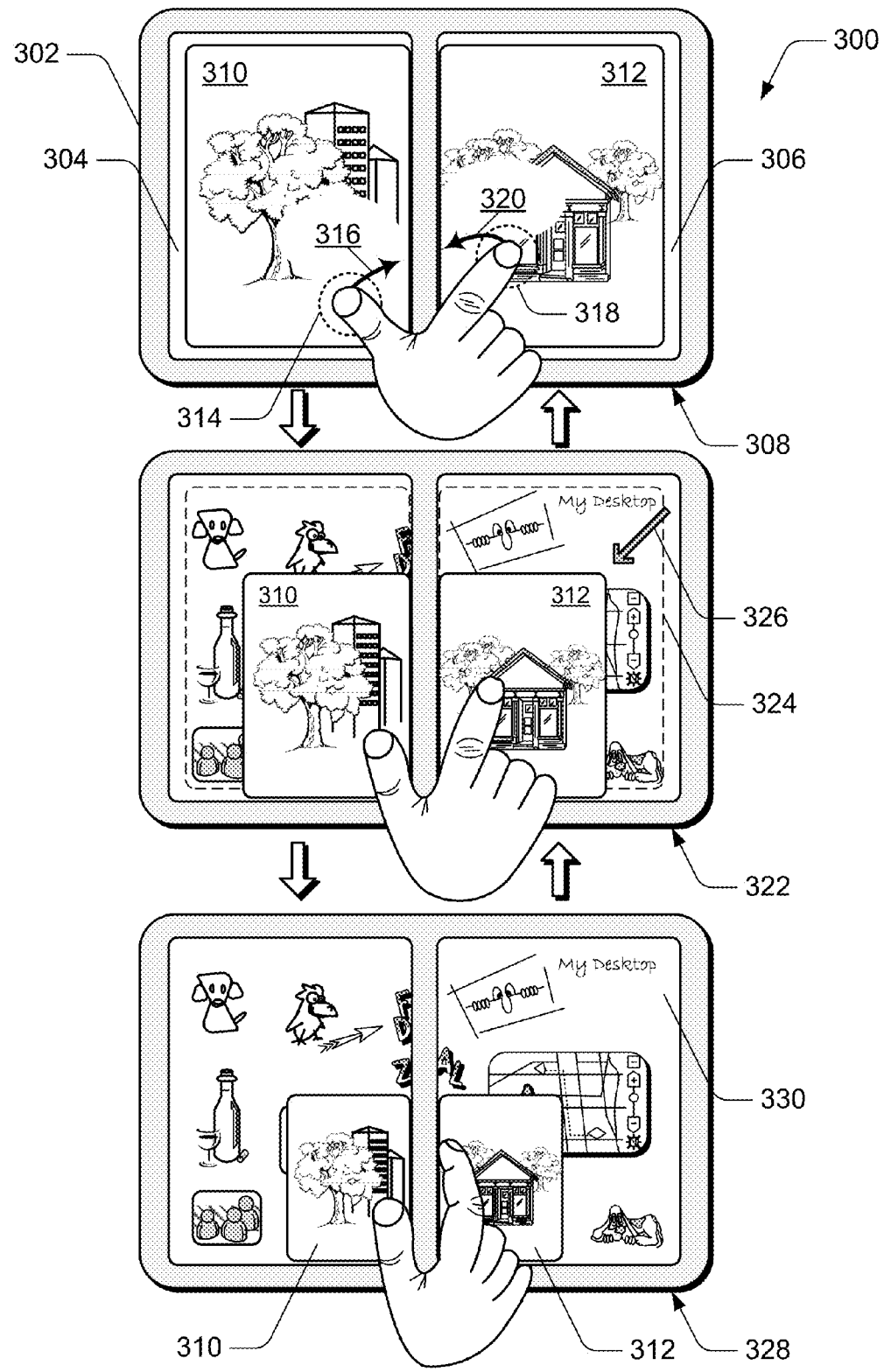
FIG. 3 illustrates an example of multi-screen pinch and expand gestures on a multi-screen system.

FIG. 3 illustrates examples 300 of multi-screen pinch and expand gestures on a multi-screen system 302, which in these examples, is shown as a two-screen device. The multi-screen system 302 may be implemented as any of the various devices described with reference to FIGS. 1 and 2. In this example, the multi-screen system 302 includes a first screen 304 and a second screen 306, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 302 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of multi-screen pinch and expand gestures can be implemented by a multi-screen system having more than two screens.

A multi-screen pinch gesture can be used to condense a displayed object on multiple screens of a multi-screen system. Alternatively, a multi-screen expand gesture can be used to expand a displayed object for display on multiple screens of the multi-screen system. In the first view 308 of the multi-screen system 302, a first journal page 310 is displayed on the first screen 304, and a second journal page 312 is displayed on the second screen 306. The input recognition system 110 is implemented to recognize a first input 314 at the first screen 304, where the first input also includes a first motion input 316. The input recognition system 110 can also recognize a second input 318 at the second screen 306, where the second input also includes a second motion input 320, and the second input is recognized approximately when the first input is recognized.

The gesture module 108 is implemented to determine the multi-screen pinch gesture from the motion inputs 316, 320 that are associated with the recognized first and second inputs 314, 318. The pinch gesture can be identified as a cross-screen combination of the first and second motion inputs that are effective to condense the displayed journal pages 310, 312. In an implementation, the input recognition system 110 can recognize that a distance between the first and second inputs changes (e.g., decreases) with the motion inputs. The change in distance may also have minimum distance thresholds. The gesture module 108 can then determine the pinch gesture from a decrease in the distance between the first and second inputs.

In some embodiments, a multi-screen pinch gesture is determined when the gesture motion inputs are recognized within a defined zone or region proximate the edge shared by the screens, such as a bezel that separates the first and second screens on the multi-screen device. The zone or region proximate the bezel can be defined as a minimum distance from the edge or bounding rectangle where a pinch gesture is recognized. In other embodiments, segments of a pinch gesture may be incrementally recognized, such as when a pinch gesture is composed of: approximate synchronous inputs (e.g., finger-touch-contacts) on adjacent edges; the first input 314 holds while the second motion input 320 slides toward the bezel (e.g., one finger holding while the other finger slides toward the common edge); or approximate synchronous lifts of both fingers resulting in a composite pinch gesture. Additionally, a user can input expand and pinch gestures in opposite directions back and forth between the gesture states until lifting the first and second inputs. Similar to a double-tap gesture on a user interface, applications can subscribe to a composite high-level pinch and/or expand gesture that includes some or all of the gesture segments.

The second view 322 of the multi-screen system 302 illustrates a transition of the journal pages 310, 312 being condensed from an original position 324 in a direction 326 in response to the pinch gesture. The third view 328 of the multi-screen system 302 illustrates the journal pages 310, 312 condensed for display. The pinch gesture gives the appearance of zooming-out when a displayed object is condensed. In this example, the pinch gesture condenses the journal pages, zooming-out to a virtual desktop 330 on the multi-screen system 302. The virtual desktop 330 may be used as a space to navigate to other journals or books, drag displayed objects between journal pages, or leave reminders such as posted notes and to-do lists that are visible for quick access outside of any particular individual notebook, e-book, journal, or document. Alternate navigable views may include: an organizational view of thumbnail images of multiple pages of a notebook (e.g., a "light table view"); a minimized or shrunken-down version of the current notebook with multiple pages, page tabs, and/or bookmarks protruding from the notebook, and a surround similar to the virtual desktop 330 (e.g., a "butterfly view"); a "library view" across multiple books and/or journals; or a home screen.

From the third view 328, a multi-screen expand gesture can be used to return to the full-screen view of the journal pages, such as shown in the first view 308. The gesture module 108 is also implemented to determine the multi-screen expand gesture that can be identified as a cross-screen combination of motion inputs that are effective to expand the journal pages 310, 312 from the condensed display shown in the third view 328 of the multi-screen system. In an implementation, the input recognition system 110 can recognize that a distance between inputs changes (e.g., increases) with motion inputs. The gesture module 108 can then determine the expand gesture from an increase in the distance between inputs. A transition from the third view 328 back to the first view 308 of the multi-screen system 302 illustrates that the journal pages 310, 312 are expanded for full-screen display on the first and second screens. The expand gesture gives the appearance of zooming-in when a displayed object is expanded.

It should be noted that the representations of the first and second inputs, as well as the indications of motion directions, are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system. Additionally, a three-, four-, or five-finger multi-screen pinch or expand gesture that spans two or more screens is also contemplated, as are two-handed stretch and squeeze gestures that may be recognized and determined from multiple finger and/or contact inputs.

Figure 4:
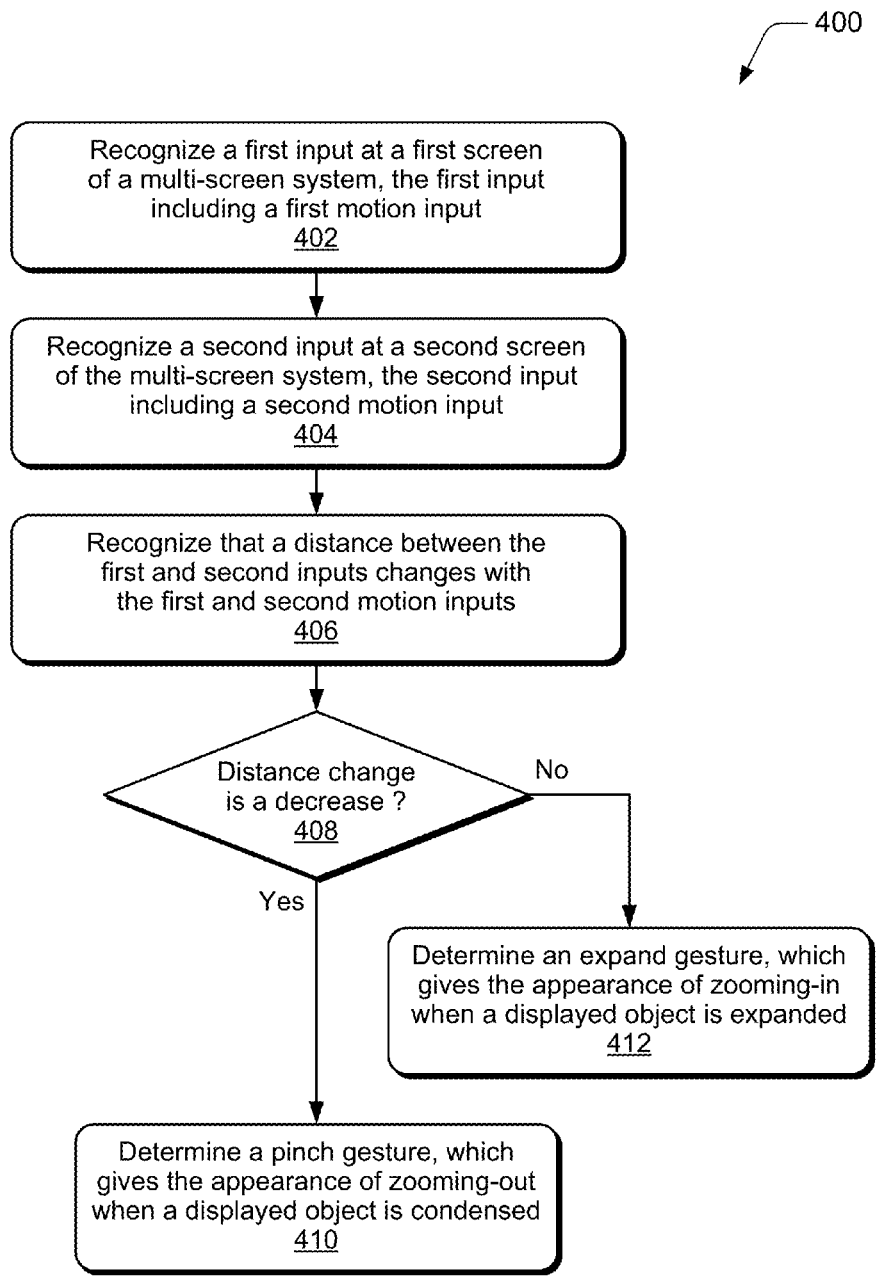
FIG. 4 illustrates example method(s) for multi-screen pinch and expand gestures in accordance with one or more embodiments.

FIG. 4 illustrates example method(s) 400 of multi-screen pinch and expand gestures. The order in which the method is described is not intended to be construed as a limitation, and any number of the described method blocks can be combined in any order to implement the method, or an alternate method.

At block 402, a first input is recognized at a first screen of a multi-screen system, the first input including a first motion input. For example, the input recognition system 110 recognizes the first input 314 at the first screen 304 of the multi-screen system 302, the first input including the first motion input 316. At block 404, a second input is recognized at a second screen of the multi-screen system, the second input including a second motion input. For example, the input recognition system 110 also recognizes the second input 318 at the second screen 306, the second input including the second motion input 320, and the second input being recognized approximately when the first input is recognized. Alternatively or in addition, the first input 314 at the first screen 304 may initiate a time-out (e.g., 500 ms) with the input recognition system 110 after which the first input is processed for other single screen gestures if the second input is not provided.

At block 406, a change in distance between the first and second inputs is recognized based on the first and second motion inputs. For example, the input recognition system 110 recognizes that a distance between the first and second inputs 314, 318 changes (e.g., increases or decreases) with the motion inputs. At block 408, a determination is made as to whether the distance change between the first and second inputs is a decrease in the distance.

If the distance decreases between the first and second inputs (i.e., "yes" from block 408), then at block 410, a pinch gesture is determined, which gives the appearance of zooming-out when a displayed object is condensed. For example, the gesture module 108 determines the pinch gesture based on the first and second motion inputs that decrease the distance between the first and second inputs. The pinch gesture can be identified as a cross-screen combination of the first and second motion inputs that are effective to condense a displayed object, such as the displayed journal pages 310, 312. The pinch gesture gives the appearance of zooming-out when a displayed object is condensed.

If the distance increases between the first and second inputs (i.e., "no" from block 408), then at block 412, an expand gesture is determined, which gives the appearance of zooming-in when a displayed object is expanded. For example, the gesture module 108 determines the expand gesture based on the first and second motion inputs that increase the distance between the first and second inputs. The expand gesture can be identified as a cross-screen combination of the first and second motion inputs that are effective to expand a displayed object, such as when the displayed journal pages 310, 312 are expanded for full-screen display on the first and second screens of the multi-screen system 302.

Multi-Screen Pinch-to-Pocket Gesture

Figure 5:
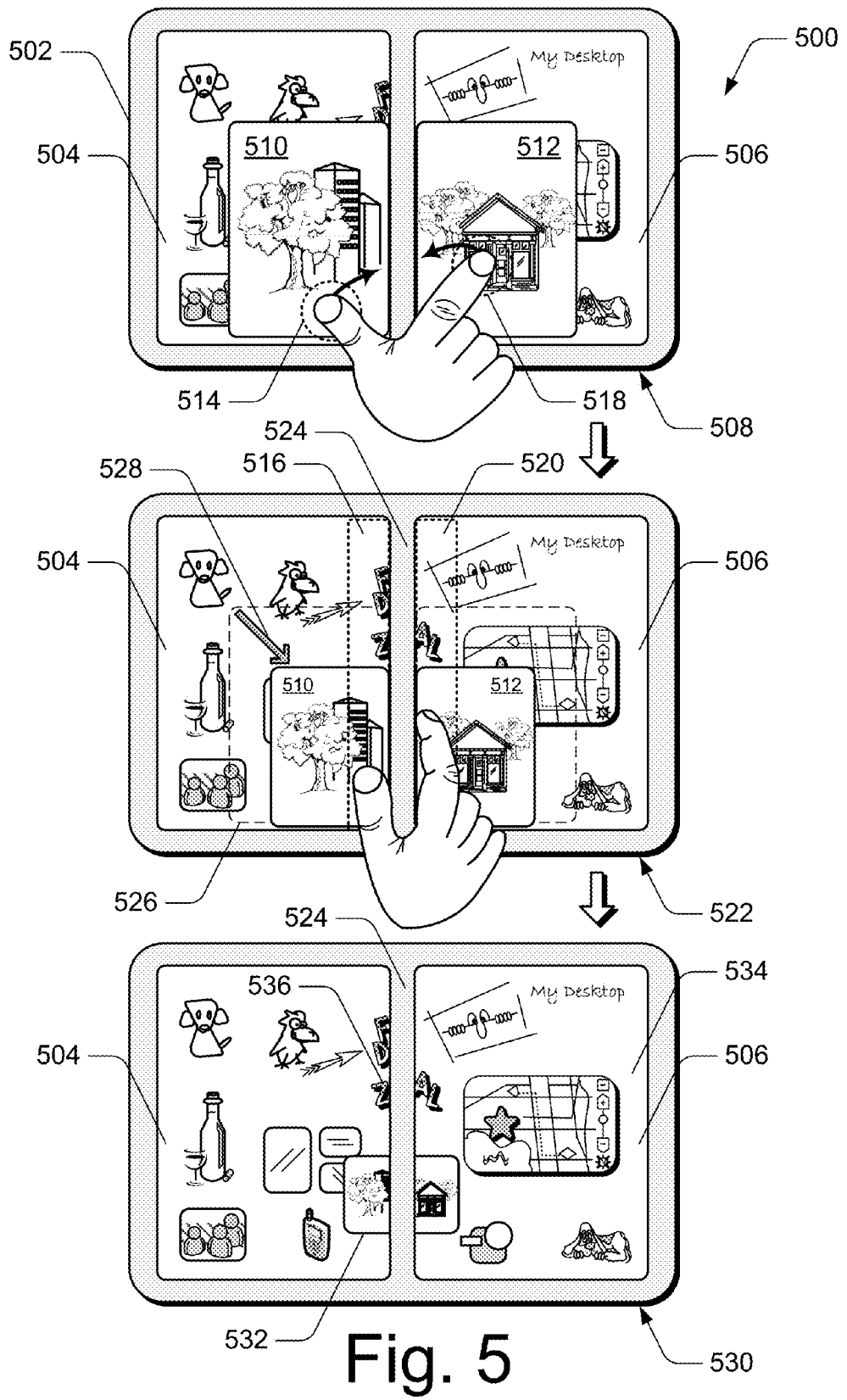
FIG. 5 illustrates an example of a multi-screen pinch-to-pocket gesture on a multi-screen system.

FIG. 5 illustrates examples 500 of a multi-screen pinch-to-pocket gesture on a multi-screen system 502, which in these examples, is shown as a two-screen device. The multi-screen system 502 may be implemented as any of the various devices described with reference to FIGS. 1 and 2. In this example, the multi-screen system 502 includes a first screen 504 and a second screen 506, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 502 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen pinch-to-pocket gesture can be implemented by a multi-screen system having more than two screens.

A multi-screen pinch-to-pocket gesture can be used to pocket a displayed object, such as to save the displayed object as a thumbnail image under a bezel of a multi-screen system. In the first view 508 of the multi-screen system 502, a first journal page 510 is displayed on the first screen 504, and a second journal page 512 is displayed on the second screen 506. The input recognition system 110 is implemented to recognize a first motion input 514 to a first screen region 516 at the first screen 504, where the first motion input is recognized when the first journal page 510 is selected. The input recognition system 110 can also recognize a second motion input 518 to a second screen region 520 at the second screen 506, where the second motion input is recognized when the second journal page 512 is selected. The first screen region 516 of the first screen 504 and the second screen region 520 of the second screen 504 are shown in a second view 522 of the multi-screen system 502.

The gesture module 108 is implemented to determine the pinch-to-pocket gesture from the recognized motion inputs 514, 518. The pinch-to-pocket gesture can be identified as a cross-screen combination of the first and second motion inputs that are effective to condense the displayed journal pages 510, 512 within the first and second screen regions 516, 520 and pocket the journal pages proximate a bezel 524 that separates the first and second screens. Optionally, the gesture module 108 may also determine the pinch-to-pocket gesture from the first and second motion inputs 514, 518 that decrease a distance between a first input to the journal page 510 on the first screen 504 and a second input to the second journal page 512 on the second screen 506.

The second view 522 of the multi-screen system 502 illustrates a transition of the journal pages 510, 512 being condensed from an original position 526 in a direction 528 in response to the pinch-to-pocket gesture. The third view 530 of the multi-screen system 502 illustrates the displayed object (e.g., the journal pages) pocketed proximate the bezel 524 and saved as a thumbnail image 532 for display. In this example, more of the virtual desktop 534 is displayed, and any of the other displayed objects on the desktop are accessible while the journal pages are pocketed as the thumbnail image 532. In another example, a displayed object 536 (e.g., shown displayed as a sketch of the text "zeal" on the computing device 102 in FIG. 1) is pocketed under the bezel 524 of the multi-screen system 502.

When displayed objects are pocketed to display the virtual desktop 534 for access to the many other displayed objects, a user can interleave multiple tasks in multiple journals or application views, and then easily return to the pocketed items. Additionally, a pocketed item can be dropped onto a notebook or journal page of an open notebook to incorporate the item in the context of other work and notations.

In various embodiments, a multi-screen pinch-to-pocket gesture may be used as a general mechanism for multi-tasking between different working sets of screen views and/or applications. For example, if a Web browser is displayed on the first screen 504 and a journal page is displayed on the second screen 506, then a user can pinch-to-pocket that pairing of screen views. A user may also pinch-to-pocket multiple screen views, in which case the set of pocketed views along the bezel 524 of the device appear as a taskbar from which the user can alternate between different applications and views.

In embodiments, the thumbnail image 532 of the journal pages is saved to a visual clip-board when pocketed. Additionally, the thumbnail image 532 may be displayed on the first and/or second screens as a selectable link to the journal pages when the displayed object is pocketed. From this third view 530, the input recognition system 110 can recognize a select input that the gesture module 108 determines as a tap gesture on the thumbnail image 532 that is effective to expand the journal pages 510, 512 for display on the first and second screens, such as shown in the first view 508 of the multi-screen system 502.

It should be noted that the representations of the first and second inputs and the indications of the motion directions, as well as the screen regions, are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 6:
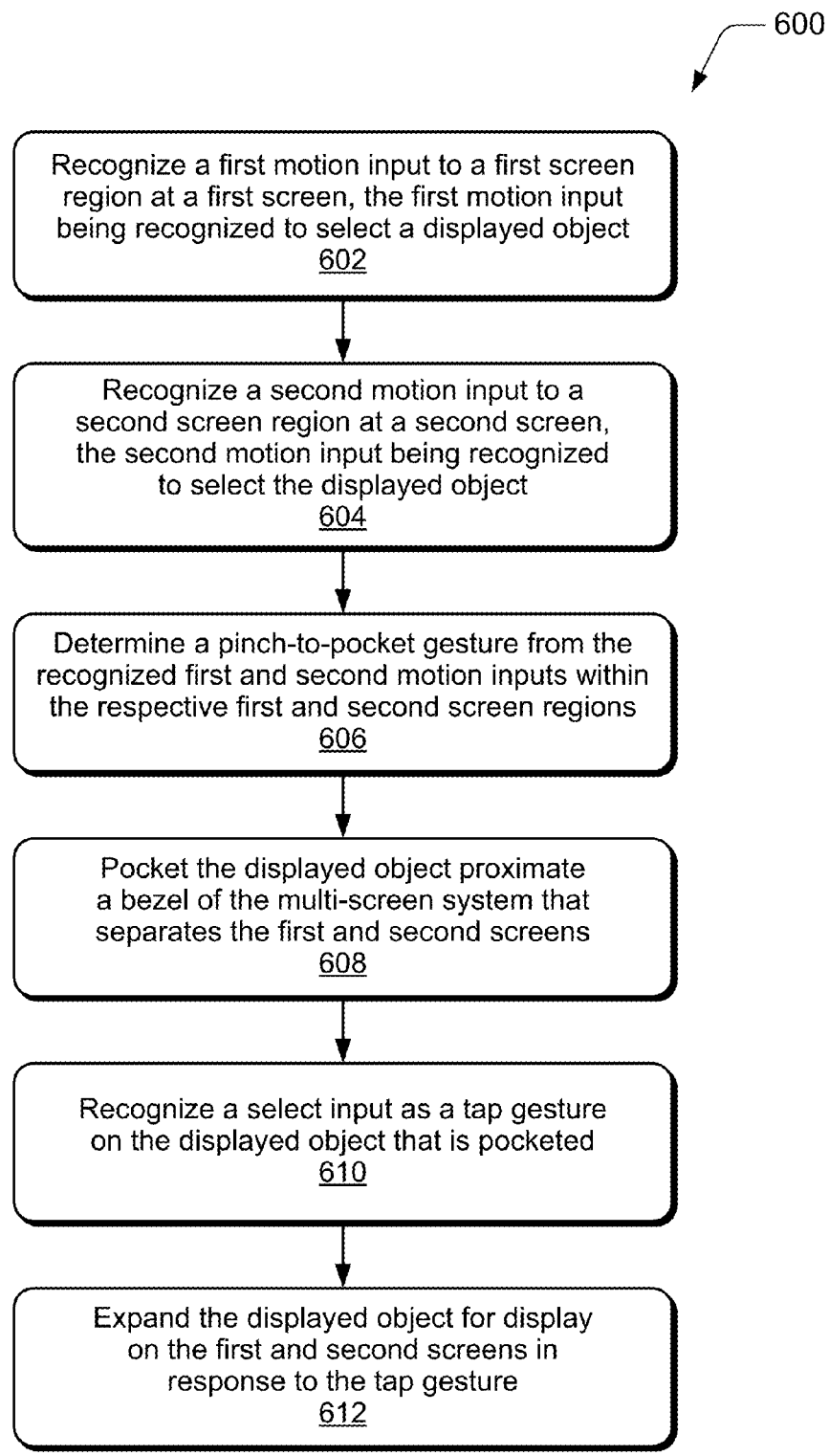
FIG. 6 illustrates example method(s) for a multi-screen pinch-to-pocket gesture in accordance with one or more embodiments.

FIG. 6 illustrates example method(s) 600 of a multi-screen pinch-to-pocket gesture. The order in which the method is described is not intended to be construed as a limitation, and any number of the described method blocks can be combined in any order to implement the method, or an alternate method.

At block 602, a first motion input to a first screen region is recognized at a first screen of a multi-screen system, the first motion input being recognized to select a displayed object. For example, the input recognition system 110 recognizes the first motion input 514 to the first screen region 516 at the first screen 504, and the first motion input is recognized when the first journal page 510 is selected. At block 604, a second motion input to a second screen region is recognized at a second screen of the multi-screen system, the second motion input being recognized to select the displayed object. For example, the input recognition system 110 also recognizes the second motion input 518 to the second screen region 520 at the second screen 506, and the second motion input is recognized when the second journal page 512 is selected.

At block 606, a pinch-to-pocket gesture is determined from the recognized first and second motion inputs within the respective first and second screen regions. For example, the gesture module 108 determines the pinch-to-pocket gesture from the recognized motion inputs 514, 518. The pinch-to-pocket gesture can be identified as a cross-screen combination of the first and second motion inputs that are effective to condense the displayed journal pages 510, 512 within the first and second screen regions 516, 520 and pocket the journal pages proximate the bezel 524 that separates the first and second screens. Alternatively or in addition, the pinch-to-pocket gesture is determined from the first and second motion inputs that decrease a distance between a first input to the first journal page 510 on the first screen and a second input to the second journal page 512 on the second screen.

At block 608, the displayed object is pocketed proximate a bezel of the multi-screen system that separates the first and second screens. For example, the journal pages 510, 512 (e.g., the displayed object) are pocketed proximate the bezel 524 and saved as a thumbnail image 532 for display. In an embodiment, the thumbnail image 532 is a selectable link to the journal pages pocketed and/or the displayed object is saved to a visual clip-board.

At block 610, a select input is recognized as a tap gesture on the displayed object that is pocketed and, at block 612, the displayed object is expanded for display on the first and second screens in response to the tap gesture. For example, the input recognition system 110 recognizes a select input that the gesture module 108 determines as a tap gesture on the thumbnail image 532 that is effective to expand the journal pages 510, 512 for display on the first and second screens of the multi-screen system 502.

Multi-Screen Dual Tap Gesture

Figure 7:
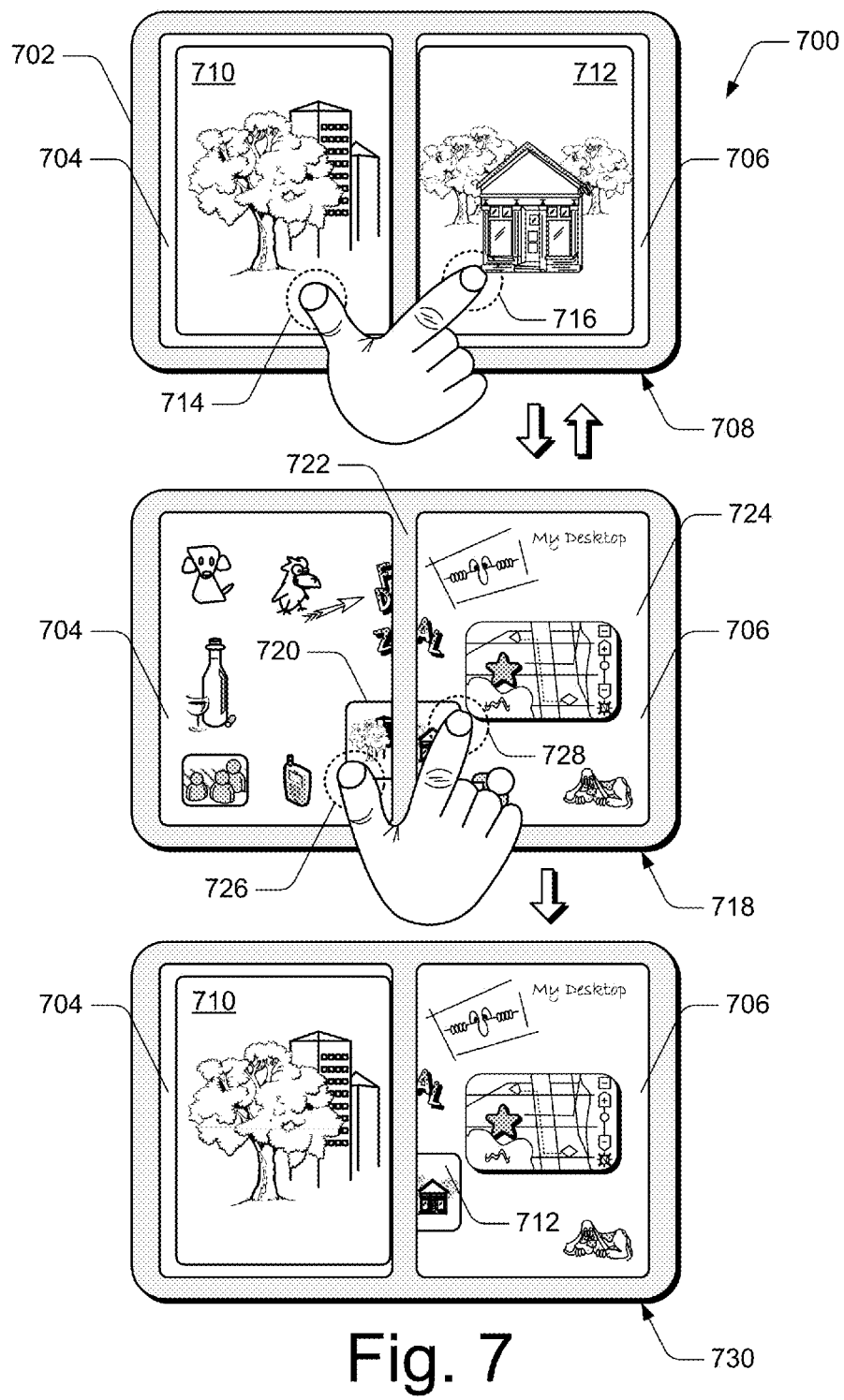
FIG. 7 illustrates an example of a multi-screen dual tap gesture on a multi-screen system.

FIG. 7 illustrates examples 700 of a multi-screen dual tap gesture on a multi-screen system 702, which in these examples, is shown as a two-screen device. The multi-screen system 702 may be implemented as any of the various devices described with reference to FIGS. 1 and 2. In this example, the multi-screen system 702 includes a first screen 704 and a second screen 706, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 702 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen dual tap gesture can be implemented by a multi-screen system having more than two screens.

A multi-screen dual tap gesture can be used to expand or pocket a displayed object that is displayed on multiple screens of a multi-screen system. For example, a displayed object can be expanded for full-screen display on first and second screens when a dual tap gesture is determined while the displayed object is pocketed. Alternatively, a displayed object can be pocketed when a dual tap gesture is determined while the displayed object is displayed full-screen on the first and second screens.

In the first view 708 of the multi-screen system 702, a first journal page 710 is displayed on the first screen 704, and a second journal page 712 is displayed on the second screen 706. The input recognition system 110 is implemented to recognize a first tap input 714 to the first journal page 710 at the first screen 704. The input recognition system 110 can also recognize a second tap input 716 to the second journal page 712 at the second screen 706, where the second tap input is recognized approximately when the first tap input is recognized.

Alternatively, a single input (e.g., with a finger, thumb, palm, etc.) may contact both the first and second screens at approximately the same time to initiate a dual-tap gesture input. For example, the multi-screen device may have little or no spine, housing, or bezel between the screens, in which case a single input can contact both screens together. Further, a multi-screen system with two (or more) independent screens may be positioned such that a thumb or finger between the screens (e.g., like a finger placed between pages in a book) makes contact with both screens.

The gesture module 108 is implemented to determine the multi-screen dual tap gesture from the recognized tap inputs 714, 716. The dual tap gesture can be identified as a cross-screen combination of the first and second tap inputs. The second view 718 of the multi-screen system 702 illustrates that the dual tap gesture is effective to pocket the journal pages as a thumbnail image 720 proximate a bezel 722 of the multi-screen system that separates the first and second screens. In this example, the virtual desktop 724 is displayed, and any of the other displayed objects on the desktop are accessible while the journal pages are pocketed as the thumbnail image 720.

The second view 718 of the multi-screen system 702 also illustrates that a dual tap gesture is effective to expand a displayed object for display on the first and second screens of the multi-screen system. For example, the input recognition system 110 is implemented to recognize a first tap input 726 to the thumbnail image 720 at the first screen 704, and recognize a second tap input 728 to the thumbnail image 720 at the second screen 706, where the second tap input is recognized approximately when the first tap input is recognized. The gesture module 108 can then determine the multi-screen dual tap gesture from the recognized tap inputs 726, 728, and the dual tap gesture effective to expand the journal pages 710, 712 for display on the first and second screens as shown in the first view 708 of the multi-screen system 702.

The third view 730 of the multi-screen system 702 illustrates a split-screen view that includes a first part of the displayed object being displayed full-screen on the first screen and a second part of the displayed object being displayed condensed on the second screen. For example, the first journal page 710 is displayed full-screen on the first screen 704, and the second journal page 712 is pocketed for display on the second screen 706. In an implementation, the input recognition system 110 can recognize a single select input to one of the journal pages 710, 712 on one of the first or second screens, such as one of the tap inputs 726, 728 shown in the second view 718 of the multi-screen system 702. The single tap input is effective to initiate the split-screen view of the journal pages, such as shown in the third view 730 of the multi-screen system 702.

It should be noted that the representations of the first and second inputs are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 8:
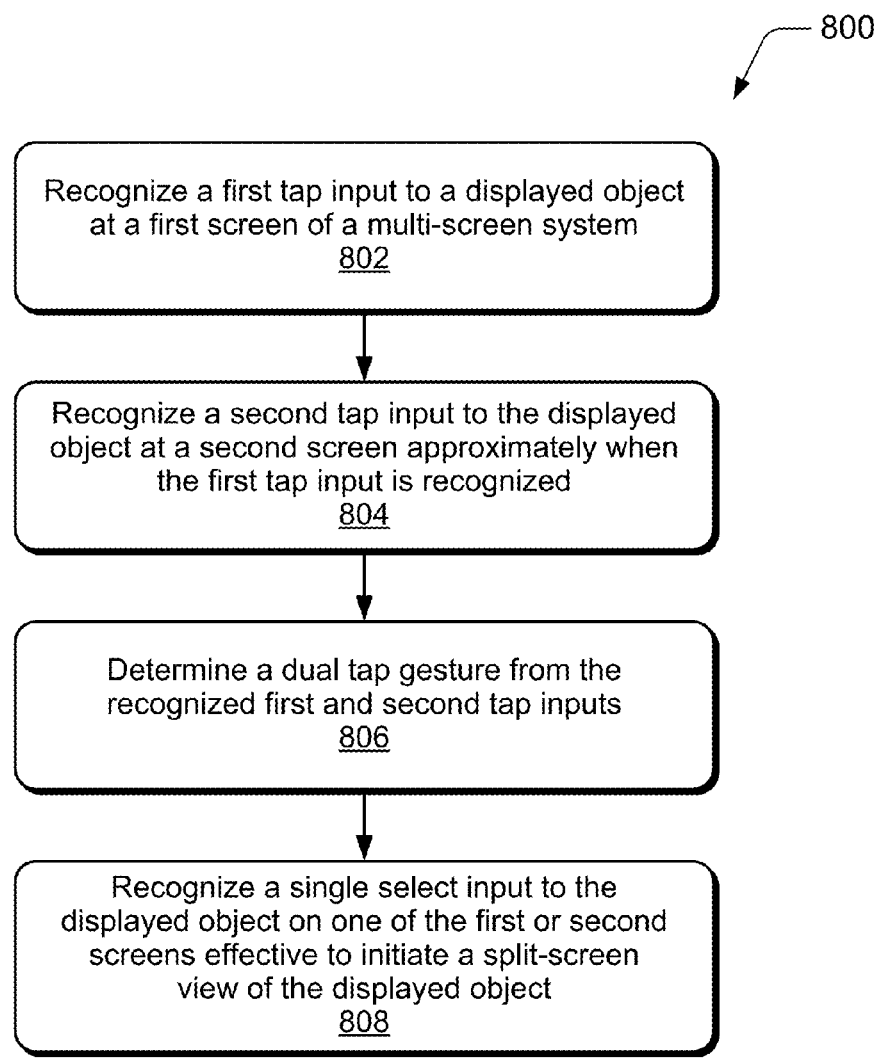
FIG. 8 illustrates example method(s) for a multi-screen dual tap gesture in accordance with one or more embodiments.

FIG. 8 illustrates example method(s) 800 of a multi-screen dual tap gesture. The order in which the method is described is not intended to be construed as a limitation, and any number of the described method blocks can be combined in any order to implement the method, or an alternate method.

At block 802, a first tap input to a displayed object is recognized at a first screen of a multi-screen system. For example, the input recognition system 110 recognizes the first tap input 714 to the first journal page 710 at the first screen 704. At block 804, a second tap input to the displayed object is recognized at a second screen of the multi-screen system, the second tap input being recognized approximately when the first tap input is recognized. For example, the input recognition system 110 also recognizes the second tap input 716 to the second journal page 712 at the second screen 706, and the second tap input is recognized approximately when the first tap input is recognized.

At block 806, a dual tap gesture is determined from the recognized first and second tap inputs. For example, the gesture module 108 determines the multi-screen dual tap gesture from the recognized tap inputs 714, 716. The dual tap gesture can be identified as a cross-screen combination of the first and second tap inputs, and the dual tap gesture is effective to expand or pocket a displayed object that is displayed on the first and second screens of the multi-screen system 702. Alternatively, a single input (e.g., with a finger, thumb, palm, etc.) that contacts both the first and second screens at approximately the same time may be recognized and determined as a dual-tap gesture input. In embodiments, a displayed object can be expanded for full-screen display on the first and second screens when a dual tap gesture is determined while the displayed object is pocketed. Alternatively, a displayed object can be pocketed when a dual tap gesture is determined while the displayed object is displayed full-screen on the first and second screens.

At block 808, a single select input to the displayed object is recognized on one of the first or second screens effective to initiate a split-screen view of the displayed object. For example, the input recognition system 110 recognizes a single select input to one of the journal pages 710, 712 on one of the first or second screens, such as one of the tap inputs 726, 728 shown in the second view 718 of the multi-screen system 702. The single tap input is effective to initiate the split-screen view of the journal pages, such as shown in the third view 730 of the multi-screen system 702.

Multi-Screen Hold and Tap Gesture

Figure 9:
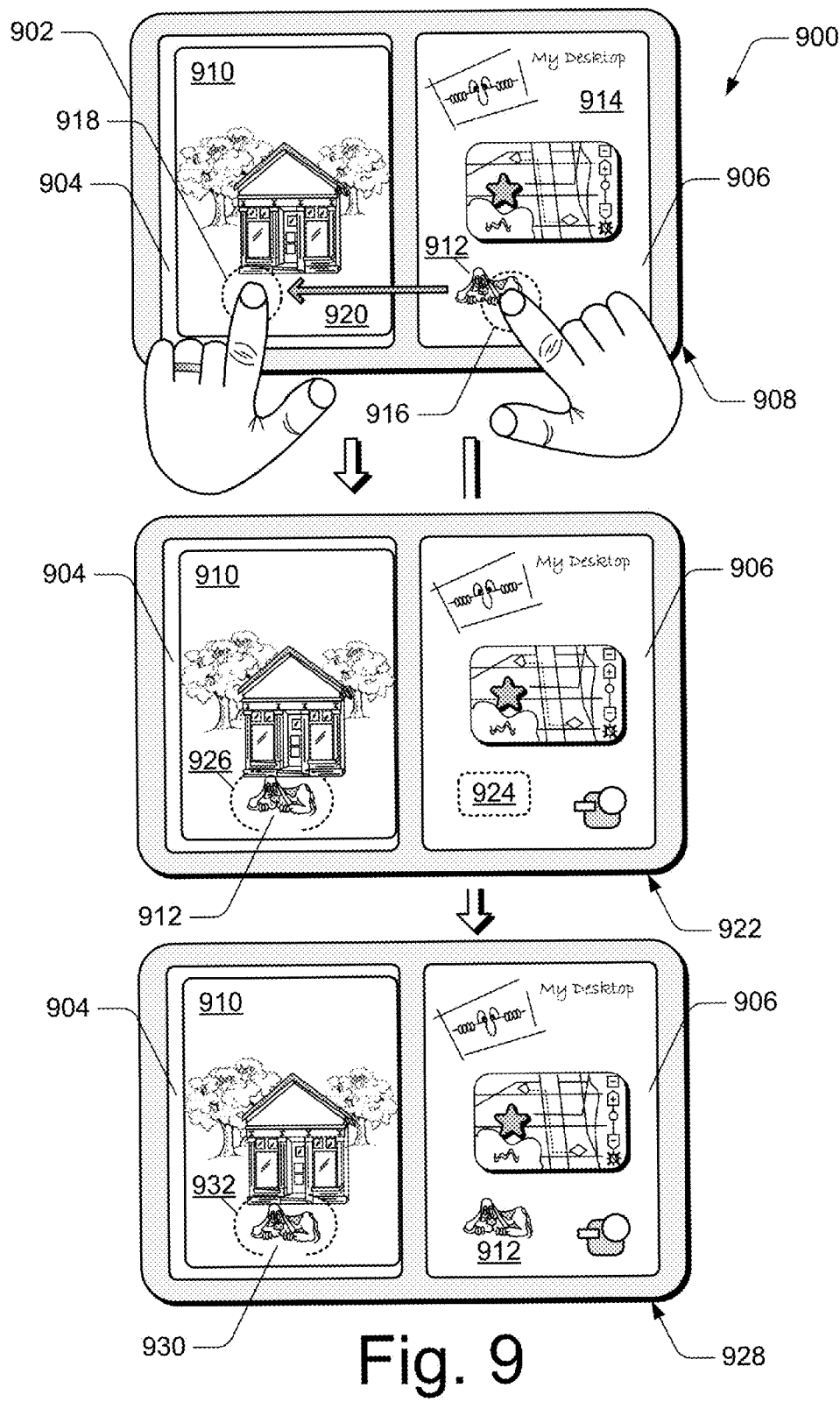
FIG. 9 illustrates an example of a multi-screen hold and tap gesture on a multi-screen system.

FIG. 9 illustrates examples 900 of a multi-screen hold and tap gesture on a multi-screen system 902, which in these examples, is shown as a two-screen device. The multi-screen system 902 may be implemented as any of the various devices described with reference to FIGS. 1 and 2. In this example, the multi-screen system 902 includes a first screen 904 and a second screen 906, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 902 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen hold and tap gesture can be implemented by a multi-screen system having more than two screens.

A multi-screen hold and tap gesture can be used to move and/or copy a displayed object from one displayed location to another, such as to move or copy an object onto a journal page, or incorporate the object into a notebook. In various embodiments, general functionality may include: a hold input to a command on one screen and a tap input on the other screen to apply the command on the other screen; a hold input to a parameter value (e.g., a color, brush thickness, image effect, filter, and the like) and a tap input on the other screen to apply the parameter value to an object displayed on the other screen; and/or a hold input to a tag, category, or other metadata, and a tap input to apply the feature to an object displayed on the other screen. In one example, a journal or notebook may include custom stickers that may be viewed on a page of the journal or notebook. A sticker can be held on one page (e.g., as displayed on one screen) and then tapped to apply the sticker at the tap location on another page (e.g., on the other screen). The stickers may have specific semantics attached to them, such as "Expense", "To-do", "Personal", "Recipe", or the like, and a sticker can be utilized to tag content to facilitate subsequent search and organization.

In the first view 908 of the multi-screen system 902, a journal page 910 is displayed on the first screen 904, and various objects, such as displayed object 912, are displayed on the virtual desktop 914 on the second screen 906. The input recognition system 110 is implemented to recognize a hold input 916 at the second screen 906, where the hold input is recognized when held to select the displayed object 912 on the second screen 906. The input recognition system 110 can also recognize a tap input 918 at the first screen 904, where the tap input is recognized while the displayed object 912 is selected on the second screen 906.

The gesture module 108 is implemented to determine the multi-screen hold and tap gesture from the recognized hold and tap inputs 916, 918. The hold and tap gesture can be identified as a cross-screen combination of the hold and tap inputs, and the gesture is effective to move the displayed object 912 from a displayed location on the second screen 906 to a tap input location for display on the first screen 904, as indicated at 920. The second view 922 of the multi-screen system 902 illustrates that the dual tap gesture is effective to move the displayed object 912 from the displayed location 924 on the second screen 906 and incorporate the displayed object 912 for display on the journal page 910 that is displayed at the tap input location 926 on the first screen 904. The third view 928 of the multi-screen system 902 illustrates that the dual tap gesture is effective to copy the displayed object 912 to generate an object copy 930, and initiate a display of the object copy 930 at a tap input location 932 on the first screen 904.

In other embodiments of a multi-screen hold and tap gesture, the input recognition system 110 can recognize the tap input 918 to an additional displayed object (e.g., the journal page 910) on the first screen 904, and the hold and tap gesture is then effective to correlate the displayed object 912 with the additional displayed object (e.g., correlate the displayed object 912 with the journal page 910). Additionally, a displayed object may represent a function, and the hold and tap gesture is effective to apply the function of the displayed object to an additional displayed object at a tap input location on first or second screen of the multi-screen system 902.

It should be noted that the representations of the hold and tap inputs are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 10:
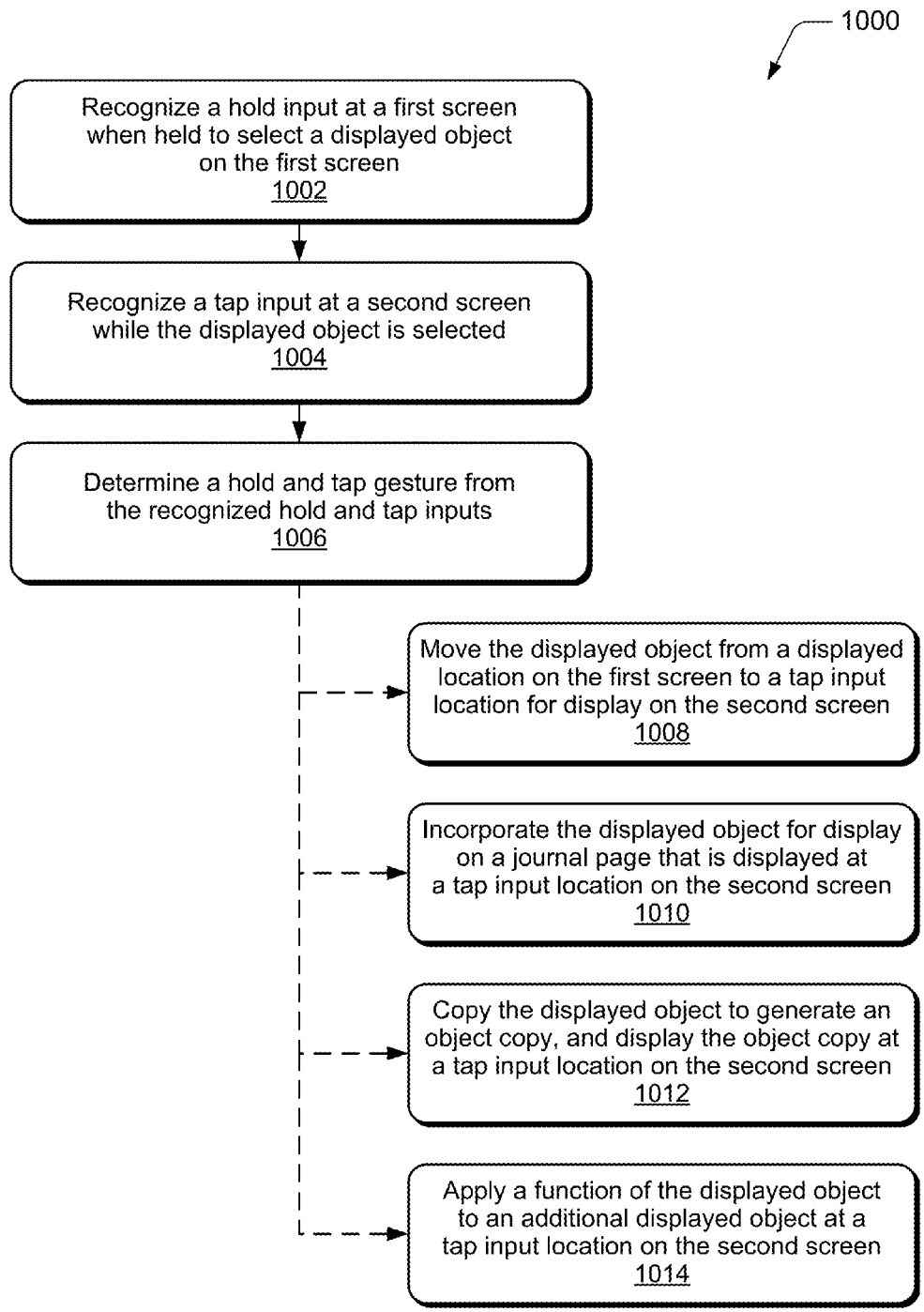
FIG. 10 illustrates example method(s) for a multi-screen hold and tap gesture in accordance with one or more embodiments.

FIG. 10 illustrates example method(s) 1000 of a multi-screen hold and tap gesture. The order in which the method is described is not intended to be construed as a limitation, and any number of the described method blocks can be combined in any order to implement the method, or an alternate method.

At block 1002, a hold input is recognized at a first screen of a multi-screen system, the hold input being recognized when held to select a displayed object on the first screen. For example, the input recognition system 110 recognizes the hold input 916 at screen 906, and the hold input is recognized when held to select the displayed object 912 on screen 906. At block 1004, a tap input is recognized at a second screen of the multi-screen system, the tap input being recognized while the displayed object is selected. For example, the input recognition system 110 also recognizes the tap input 918 at screen 904, and the tap input is recognized while the displayed object 912 is selected on screen 906. In an embodiment, the tap input may be recognized as a tap input to an additional displayed object on the second screen, and the hold and tap gesture is effective to correlate the displayed object with the additional displayed object.

At block 1006, a hold and tap gesture is determined from the recognized hold and tap inputs. For example, the gesture module 108 determines the multi-screen hold and tap gesture from the recognized hold and tap inputs 916, 918, and the hold and tap gesture can be identified as a cross-screen combination of the hold and tap inputs. In various embodiments, the hold and tap gesture is effective to move the displayed object from a displayed location on the first screen to a tap input location for display on the second screen (at block 1008); incorporate the displayed object for display on a journal page that is displayed at a tap input location on the second screen (at block 1010); copy the displayed object to generate an object copy, and display the object copy at a tap input location on the second screen (at block 1012); and/or apply a function of the displayed object to an additional displayed object at a tap input location on the second screen (at block 1014).

Multi-Screen Hold and Drag Gesture

Figure 11:
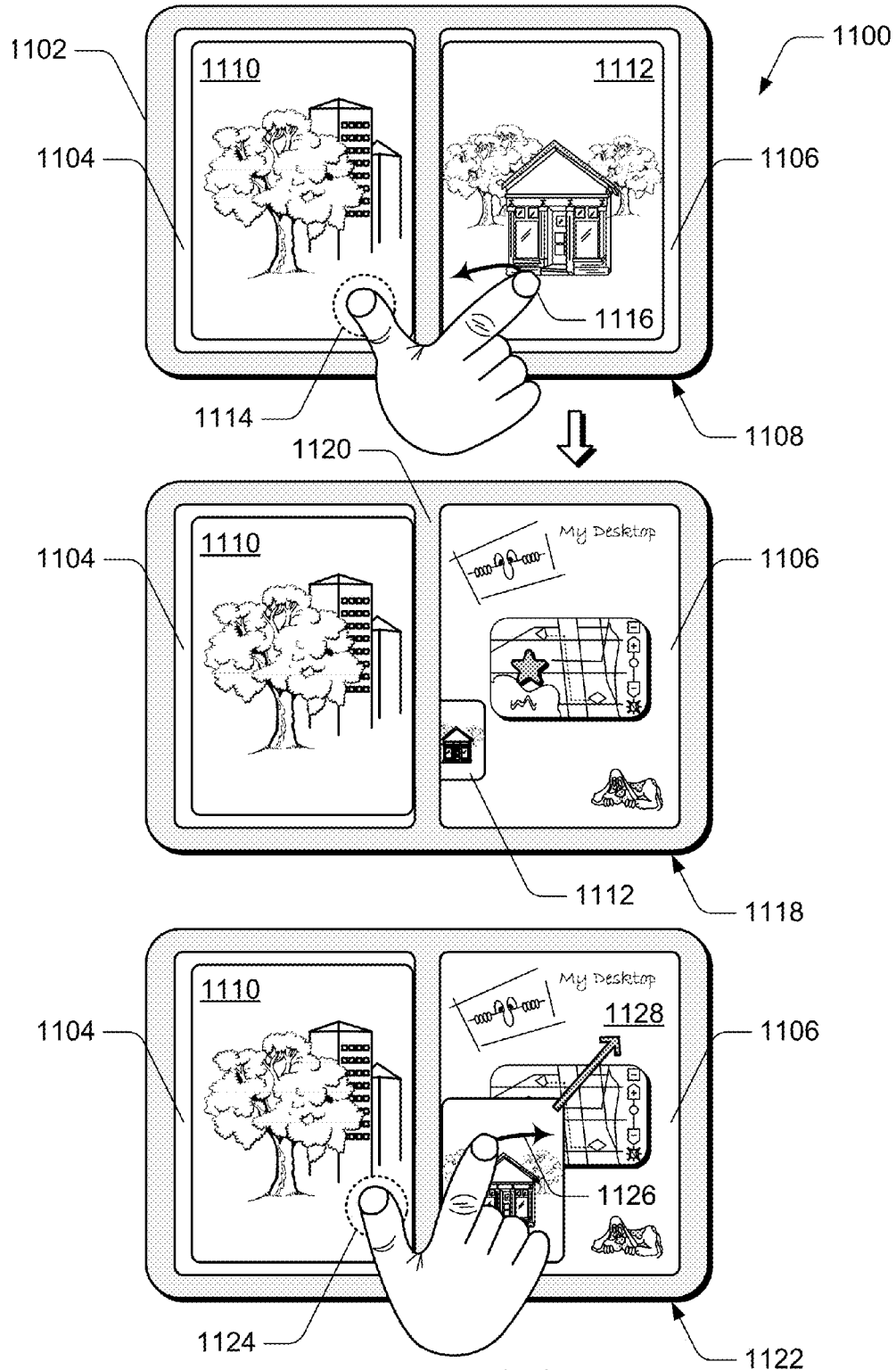
FIG. 11 illustrates an example of a multi-screen hold and drag gesture on a multi-screen system.

FIG. 11 illustrates examples 1100 of a multi-screen hold and drag gesture on a multi-screen system 1102, which in these examples, is shown as a two-screen device. The multi-screen system 1102 may be implemented as any of the various devices described with reference to FIGS. 1 and 2. In this example, the multi-screen system 1102 includes a first screen 1104 and a second screen 1106, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 1102 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen hold and drag gesture can be implemented by a multi-screen system having more than two screens.

A multi-screen hold and drag gesture can be used to maintain a display of a first part of a displayed object on one screen and drag a second part of the displayed object that is displayed on another screen to pocket the second part of the displayed object for a split-screen view. Alternatively, a hold and drag gesture can be used to maintain a display of a first part of the displayed object on one screen and drag a pocketed second part of the displayed object to expand the display on another screen. The direction of a dragging gesture may also be determined based on different semantics (e.g., motion up, down, towards the bezel, away from the bezel, etc.). For the multi-screen hold and drag gesture, four to eight cardinal directions can be defined for different actions.

In the first view 1108 of the multi-screen system 1102, a first journal page 1110 is displayed on the first screen 1104, and a second journal page 1112 is displayed on the second screen 1106. The input recognition system 110 is implemented to recognize a hold input 1114 at the first screen 1104, where the hold input is recognized when held in place. The input recognition system 110 can also recognize a motion input 1116 at the second screen 1106, where the motion input is recognized to select a displayed object (e.g., the journal page 1112) while the hold input remains in place.

The gesture module 108 is implemented to determine the multi-screen hold and drag gesture from the recognized hold and motion inputs 1114, 1116. The hold and drag gesture can be identified as a cross-screen combination of the hold and motion inputs, and the gesture is effective to maintain the display of the first journal page 1110 on the first screen 1104 and drag the second journal page 1112 that is displayed on the second screen 1106 to pocket the second journal page for a split-screen view of the journal pages. The second view 1118 of the multi-screen system 1102 illustrates that the first journal page 1110 is maintained for display on the first screen 1104, and the second journal page 1112 is pocketed proximate the bezel 1120 of the multi-screen system on the second screen 1106 for a split-screen view of the journal pages in response to the hold and drag gesture. In an embodiment, the second journal page 1112 is pocketed as a thumbnail image, which may also be a selectable link to the second journal page 1112.

The third view 1122 of the multi-screen system 1102 illustrates a multi-screen hold and drag gesture can be used to maintain a display of a first part of a displayed object on one screen and drag a pocketed second part of the displayed object to expand the display on another screen, or initiate a multi-screen display of the displayed object. For example, the input recognition system 110 can recognize a hold input 1124 at the first screen 1104, where the hold input is recognized when held in place. The input recognition system 110 can also recognize a motion input 1126 at the second screen 1106, where the motion input is recognized to select the second journal page 1112 when the journal page is pocketed (e.g., the journal page 1112 as shown in the second view 1118) while the hold input remains in place (e.g., to hold the first journal page 1110). The gesture module 108 can determine a multi-screen hold and drag gesture from the recognized hold and motion inputs 1124, 1126, effective to expand the pocketed second journal page 1112 in a direction 1128 for display on the second screen 1106.

It should be noted that the representations of the hold and motion inputs are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 12:
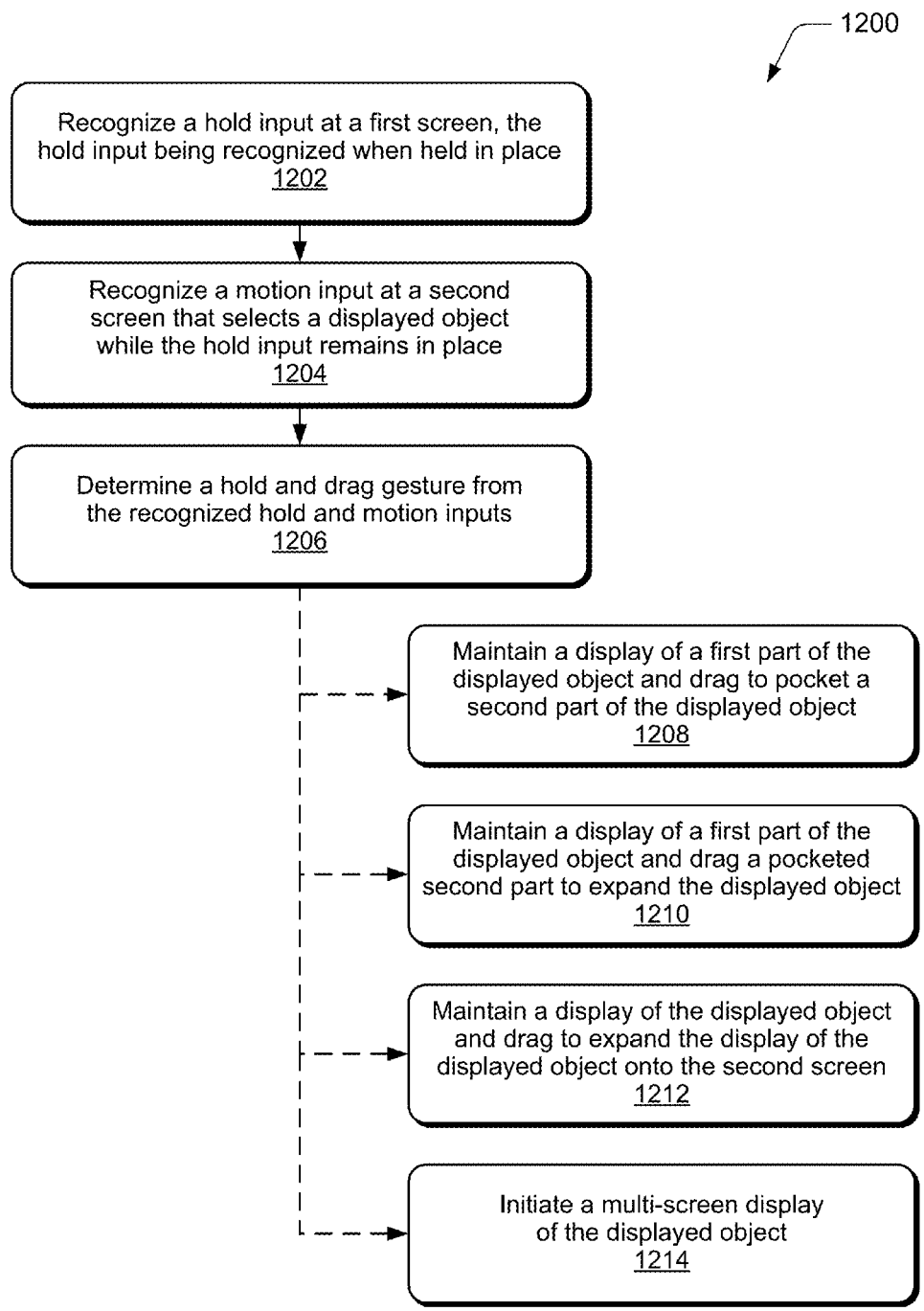
FIG. 12 illustrates example method(s) for a multi-screen hold and drag gesture in accordance with one or more embodiments.

FIG. 12 illustrates example method(s) 1200 of a multi-screen hold and drag gesture. The order in which the method is described is not intended to be construed as a limitation, and any number of the described method blocks can be combined in any order to implement the method, or an alternate method.

At block 1202, a hold input is recognized at a first screen of a multi-screen system, the hold input being recognized when held in place. For example, the input recognition system 110 recognizes the hold input 1114 at the first screen 1104, where the hold input is recognized when held in place. At block 1204, a motion input is recognized at a second screen of the multi-screen system, the motion input being recognized to select a displayed object while the hold input remains in place. For example, the input recognition system 110 also recognizes the motion input 1116 at the second screen 1106, where the motion input is recognized to select the second journal page 1112 while the hold input remains in place.

At block 1206, a hold and drag gesture is determined from the recognized hold and motion inputs. For example, the gesture module 108 determines the multi-screen hold and drag gesture from the recognized hold and motion inputs 1114, 1116. The hold and drag gesture can be identified as a cross-screen combination of the hold and motion inputs. In various embodiments, the hold and drag gesture is effective to maintain a display of a first part of the displayed object on the first screen and drag a second part of the displayed object that is displayed on the second screen to pocket the second part of the displayed object for a split-screen view (at block 1208); maintain a display of a first part of the displayed object on the first screen and drag a pocketed second part of the displayed object to expand the display on the second screen (at block 1210); maintain a display of the displayed object on the first screen and expand the display of the displayed object onto the second screen (at block 1212); and/or initiate a multi-screen display of the displayed object (at block 1214).

Multi-Screen Hold and Page-Flip Gesture

Figure 13:
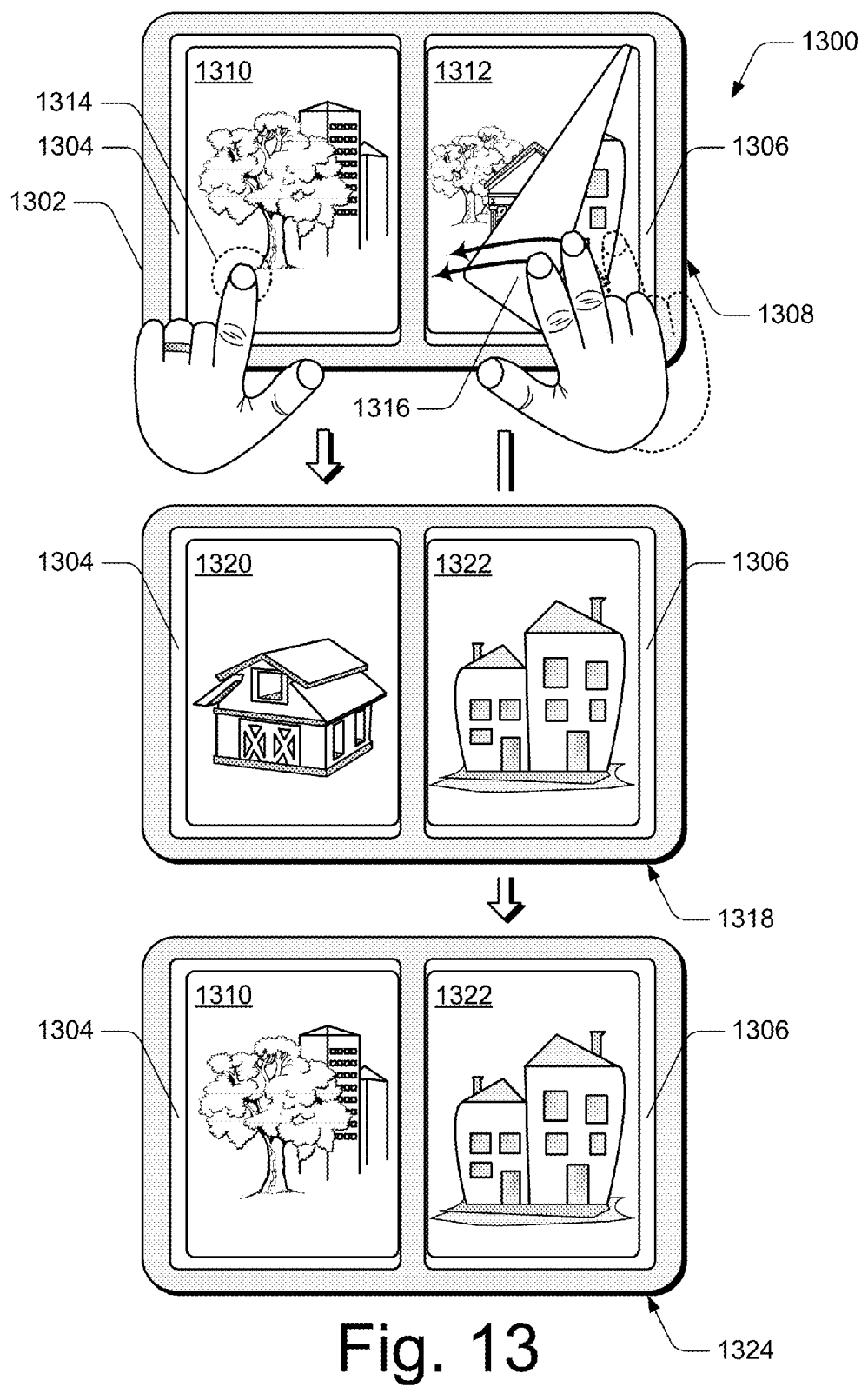
FIG. 13 illustrates an example of a multi-screen hold and page-flip gesture on a multi-screen system.

FIG. 13 illustrates examples 1300 of a multi-screen hold and page-flip gesture on a multi-screen system 1302, which in these examples, is shown as a two-screen device. The multi-screen system 1302 may be implemented as any of the various devices described with reference to FIGS. 1 and 2. In this example, the multi-screen system 1302 includes a first screen 1304 and a second screen 1306, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 1302 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen hold and page-flip gesture can be implemented by a multi-screen system having more than two screens.

A multi-screen hold and page-flip gesture can be used to select a journal page that is displayed on one screen and flip journal pages to display two additional or new journal pages, much like flipping pages in a book. The journal pages are flipped in a direction of the selected journal page to display the two new journal pages, much like flipping pages forward or backward in a book. Alternatively, a hold and page-flip gesture can be used to maintain the display of a journal page that is displayed on one screen and flip journal pages to display a different journal page on another screen. Non-consecutive journal pages can then be displayed side-by-side, which for a book, would involve tearing a page out of the book to place it in a non-consecutive page order to view it side-by-side with another page. In an embodiment, a multi-screen hold and page-flip gesture is configurable to either flip journal pages to display two new journal pages, or maintain the display of a first journal page and flip the journal pages to display a different, non-consecutive second journal page side-by-side with the first journal page.

In the first view 1308 of the multi-screen system 1302, a first journal page 1310 is displayed on the first screen 1304, and a second journal page 1312 is displayed on the second screen 1306. The input recognition system 110 is implemented to recognize a hold input 1314 at the first screen 1304, where the hold input is recognized when held to select the journal page 1310 that is displayed on the first screen 1304. The input recognition system 110 can also recognize a motion input 1316 at the second screen 1306, where the motion input is recognized while the hold input remains in place.

The gesture module 108 is implemented to determine the multi-screen hold and page-flip gesture from the recognized hold and motion inputs 1314, 1316. The hold and page-flip gesture can be identified as a cross-screen combination of the hold and motion inputs, which in various embodiments may include: hold and drag inputs on opposite screens with one or two input devices (e.g., one finger, or two fingers); and/or a hold input and a drag input across the bezel onto the opposite screen. The hold and page-flip gesture is effective to select the journal page 1310 on the first screen 1304 while one or more additional journal pages are flipped for display. The second view 1318 of the multi-screen system 1302 illustrates that two additional journal pages 1320, 1322 have been page-flipped for display on the respective first and second screens 1304, 1306. Alternatively, the third view 1324 of the multi-screen system 1302 illustrates that the display of journal page 1310 is maintained on the first screen 1304 and a non-consecutive journal page 1322 has been page-flipped for display side-by-side on the second screen 1306.

It should be noted that the representations of the hold and motion inputs are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 14:
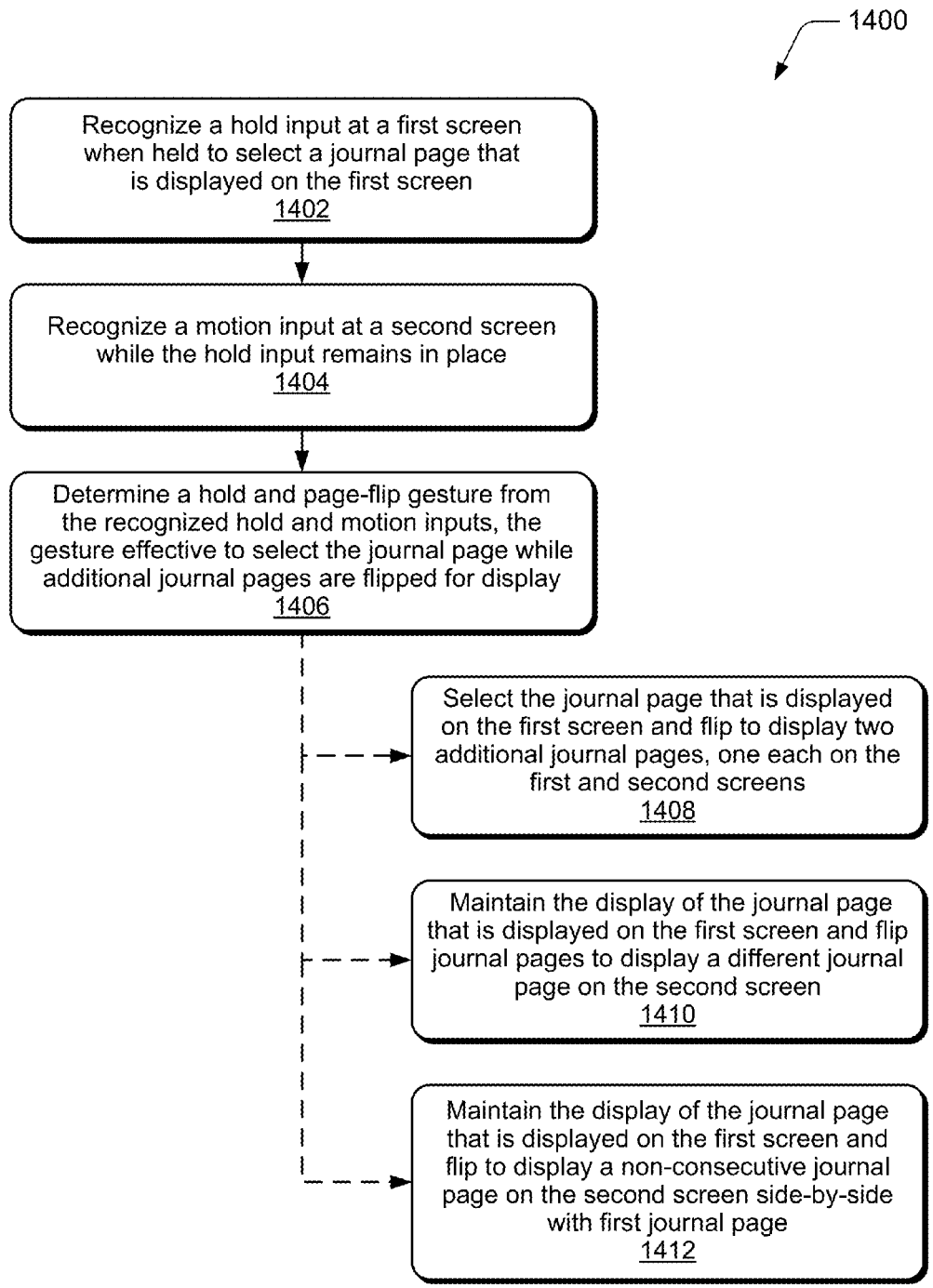
FIG. 14 illustrates example method(s) for a multi-screen hold and page-flip gesture in accordance with one or more embodiments.

FIG. 14 illustrates example method(s) 1400 of a multi-screen hold and page-flip gesture. The order in which the method is described is not intended to be construed as a limitation, and any number of the described method blocks can be combined in any order to implement the method, or an alternate method.

At block 1402, a hold input is recognized at a first screen of a multi-screen system, the hold input being recognized when held to select a journal page that is displayed on the first screen. For example, the input recognition system 110 recognizes the hold input 1314 at the first screen 1304, and the hold input is recognized when held to select the journal page 1310 that is displayed on the first screen 1304. At block 1404, a motion input is recognized at a second screen of the multi-screen system, the motion input being recognized while the hold input remains in place. For example, the input recognition system 110 also recognizes the motion input 1316 at the second screen 1306, and the motion input is recognized while the hold input remains in place.

At block 1406, a hold and page-flip gesture is determined from the recognized hold and motion inputs, and effective to select the journal page while additional journal pages are flipped for display. For example, the gesture module 108 determines the multi-screen hold and page-flip gesture from the recognized hold and motion inputs 1314, 1316. The hold and page-flip gesture is identified as a cross-screen combination of the hold and motion inputs. In various embodiments, the hold and page-flip gesture is effective to select the journal page that is displayed on the first screen and flip journal pages (optionally in a direction of the selected journal page) to display two additional journal pages, one each displayed on the first and second screens (at block 1408); maintain the display of the journal page that is displayed on the first screen and flip journal pages to display a different journal page on the second screen (at block 1410); and/or maintain the display of the journal page that is displayed on the first screen and flip journal pages to display a non-consecutive journal page on the second screen side-by-side with first journal page (at block 1412).

In an embodiment, a hold and page-flip gesture is configurable to select the journal page that is displayed on the first screen and flip journal pages to display two additional journal pages, one each displayed on the first and second screens (as described with reference to block 1408), or to maintain the display of the journal page that is displayed on the first screen and flip the journal pages to display a different journal page on the second screen (as described with reference to blocks 1410 and 1412).

Multi-Screen Bookmark Hold Gesture

Figure 15:
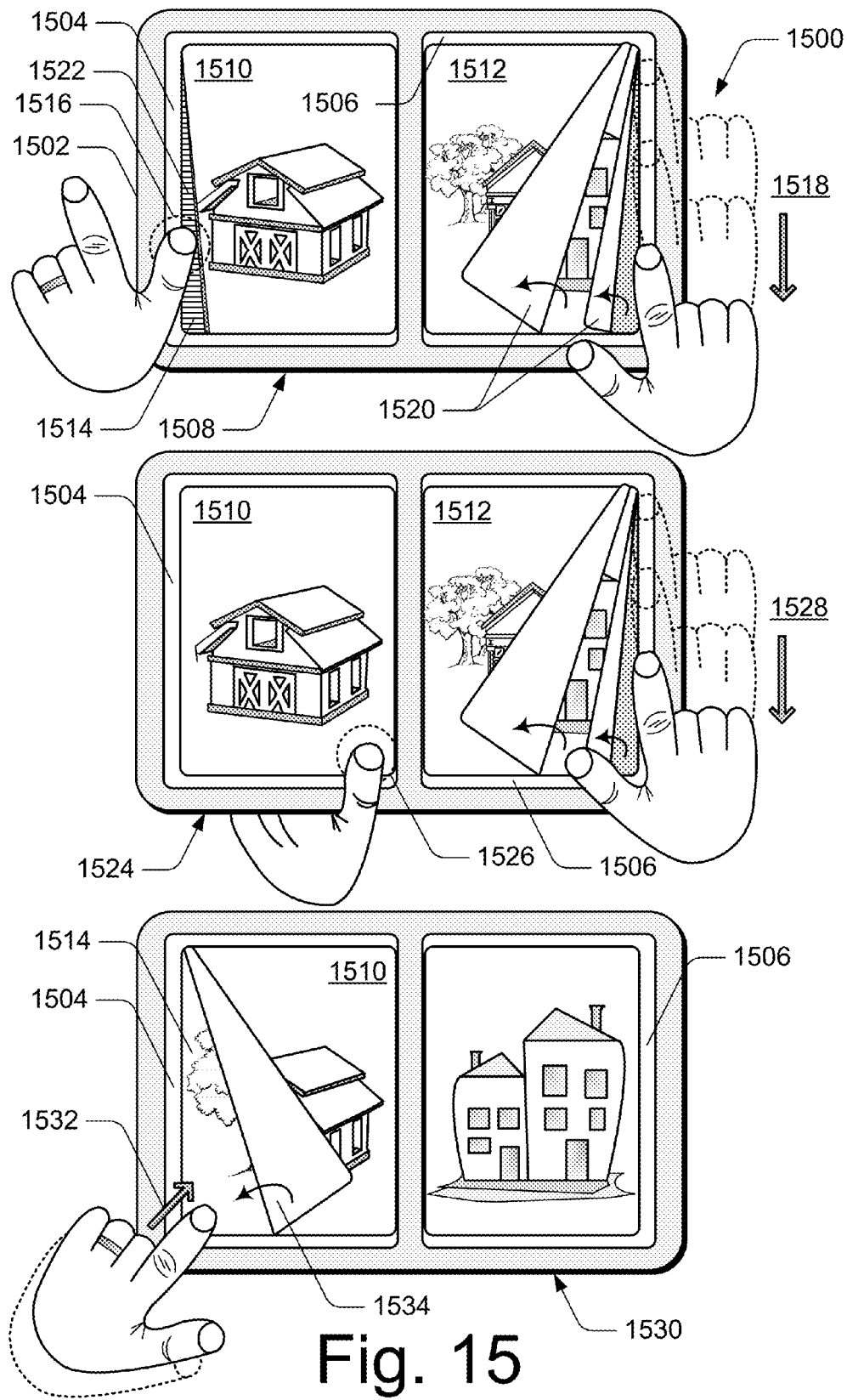
FIG. 15 illustrates an example of a multi-screen bookmark hold gesture on a multi-screen system.

FIG. 15 illustrates examples 1500 of a multi-screen bookmark hold gesture on a multi-screen system 1502, which in these examples, is shown as a two-screen device. The multi-screen system 1502 may be implemented as any of the various devices described with reference to FIGS. 1 and 2. In this example, the multi-screen system 1502 includes a first screen 1504 and a second screen 1506, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 1502 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen bookmark hold gesture can be implemented by a multi-screen system having more than two screens.

A multi-screen bookmark hold gesture can be used to bookmark a journal page at a location of a hold input to the journal page on a screen, and additional journal pages can be flipped for viewing while the bookmark is maintained for the journal page. A bookmark hold gesture mimics the action of a reader holding a thumb or finger between pages to save a place in a book while flipping through other pages of the book. Additionally, a bookmark is a selectable link back to the journal page, and a selection input of the bookmark flips back to display the journal page on the screen.

In the first view 1508 of the multi-screen system 1502, a first journal page 1510 is displayed on the first screen 1504, and a second journal page 1512 is displayed on the second screen 1506. The first journal page 1510 is displayed over a journal page 1514 that is bookmarked. The input recognition system 110 is implemented to recognize a hold input 1516 at the first screen 1504, where the hold input is recognized when held in place proximate an edge of the journal page 1514 that is bookmarked on the first screen 1504. The input recognition system 110 can also recognize a motion input 1518 at the second screen 1506, where the motion input is recognized while the hold input remains in place. In an embodiment, the motion input 1518 is recognized at the second screen 1506 along an outer edge of the journal page 1512, and the motion input is effective to flip journal pages at 1520 while the bookmark is maintained for the journal page 1514 on the first screen 1504.

The gesture module 108 is implemented to determine the multi-screen bookmark hold gesture from the recognized hold and motion inputs 1516, 1518. The bookmark hold gesture can be identified as a cross-screen combination of the hold and motion inputs, and the gesture is effective to bookmark journal page 1514 at a location of the hold input 1516 on the first screen 1504. In embodiments, a bookmark identifier 1522 is displayed to identify the journal page 1514 that is bookmarked and the location of the bookmark on the first screen. In this example, the bookmark identifier 1522 is a partial display of the journal page 1514 that is bookmarked. A bookmark and/or bookmark identifier is a selectable link to the journal page 1514 that is bookmarked on the first screen 1504, and the input recognition system 110 can recognize a selection input of the bookmark effective to flip back and display the journal page 1514 on the first screen.

The second view 1524 of the multi-screen system 1502 illustrates an alternate hold input 1526, such as when a user may hold a two-screen device with one hand while also bookmarking the journal page 1510 on the first screen 1504. The input recognition system 110 is implemented to recognize the hold input 1526 at the first screen 1504, and also recognize a motion input 1528 at the second screen 1506, where the motion input is recognized while the hold input remains in place. In an embodiment, the motion input 1528 is recognized at the second screen 1506 and is effective to flip the journal pages while the bookmark is maintained. In an implementation, the input recognition system 110 can recognize a bookmark hold gesture in defined regions, such as a region where a user is likely to both hold the device and bookmark a page. Alternatively or in addition, the multi-screen system 1502 may be implemented to sense the orientation of the screens, such that page bookmarking automatically adapts to the manner in which a user holds the device.

The third view 1530 of the multi-screen system 1502 illustrates that a hold input from which a bookmark is determined can include a slide motion input 1532 proximate a corner of the journal page 1514. The slide motion input 1532 can be recognized as a progression of motion to initiate the hold input, and the slide motion input can be determined to bookmark the journal page 1514 at the corner. The bookmark is maintained on the first screen 1504 for the journal page 1514 while other journal pages are flipped for viewing at 1534. In embodiments, there are various techniques that can be implemented to distinguish between: holding a page to temporarily save a position; explicitly "dog-earing" a page with a bookmark; or flipping back to a page denoted by a temporary hold or bookmark. In an embodiment, a hold input can be recognized to implicitly temporarily save a page position. Then a user can simply lift the input to discard the temporary bookmark or alternatively, provide the slide motion input to flip back to a saved page position. In another embodiment, if the slide motion input is initiated at approximately a same time as the hold input, then the page dog-ear bookmark can be created. In another embodiment, a dog-ear bookmark may only be recognized at defined locations around the boundary of a journal page (e.g., at the corners of the page), whereas the implicit temporary page hold can be implemented for a larger area or region.

It should be noted that the representations of the hold and motion inputs are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 16:
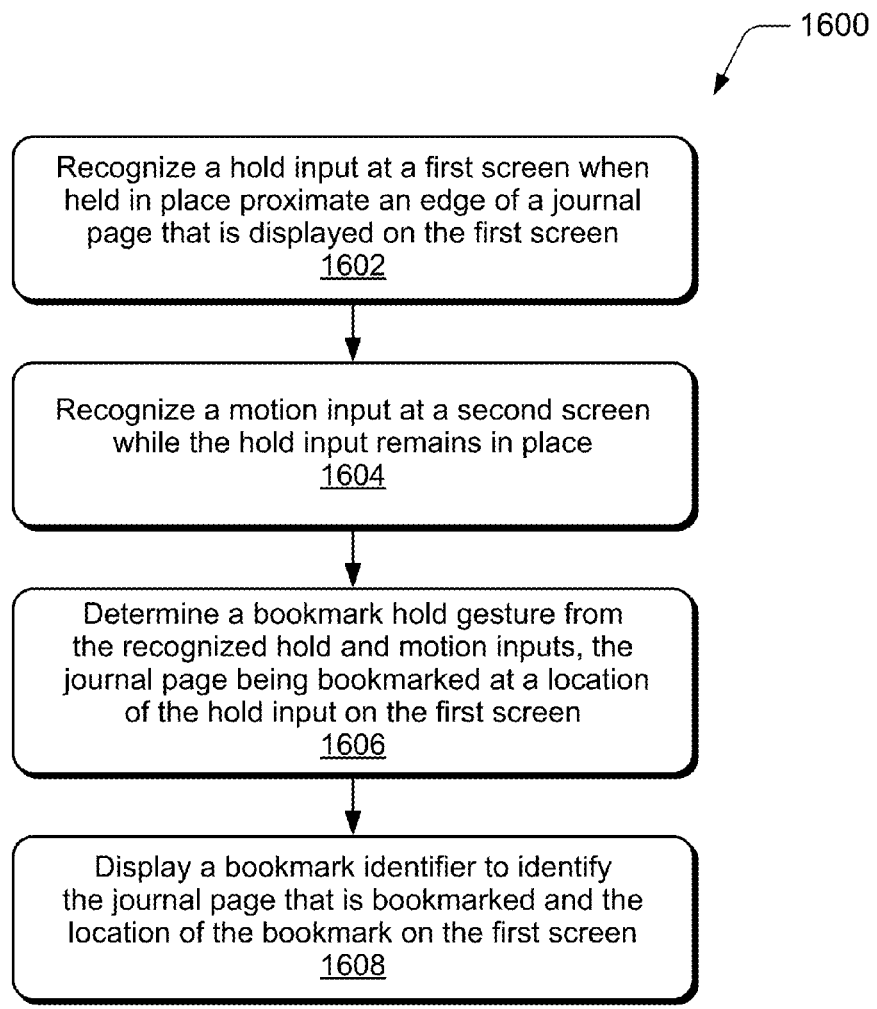
FIG. 16 illustrates example method(s) for a multi-screen bookmark hold gesture in accordance with one or more embodiments.

FIG. 16 illustrates example method(s) 1600 of a multi-screen bookmark hold gesture. The order in which the method is described is not intended to be construed as a limitation, and any number of the described method blocks can be combined in any order to implement the method, or an alternate method.

At block 1602, a hold input is recognized at a first screen of a multi-screen system, the hold input being recognized when held in place proximate an edge of a journal page that is displayed on the first screen. For example, the input recognition system 110 recognizes the hold input 1516 at the first screen 1504, and the hold input is recognized when held in place proximate an edge of the journal page 1514 that is bookmarked on the first screen 1504. The hold input can include the slide motion input 1532 proximate a corner of the journal page 1514. The input recognition system 110 recognizes the slide motion input as a progression of motion to initiate the hold input, and the gesture module 108 determines the bookmark hold gesture from the slide motion input to bookmark the journal page.

At block 1604, a motion input is recognized at a second screen of the multi-screen system, the motion input being recognized while the hold input remains in place. For example, input recognition system 110 also recognizes the motion input 1518 at the second screen 1506, and the motion input is recognized while the hold input remains in place. The input recognition system 110 can recognize the motion input along an outer edge of an opposite journal page that is displayed on the second screen 1506, and the motion input is effective to flip journal pages while the bookmark is maintained for the journal page 1514 on the first screen 1504.

At block 1606, a bookmark hold gesture is determined from the recognized hold and motion inputs, the bookmark hold gesture effective to bookmark the journal page at a location of the hold input on the first screen. For example, the gesture module 108 determines the multi-screen bookmark hold gesture from the recognized hold and motion inputs 1516, 1518. The bookmark hold gesture can be identified as a cross-screen combination of the hold and motion inputs. A bookmark and/or bookmark identifier is a selectable link to a journal page that is bookmarked on the first screen 1504, and the input recognition system 110 recognizes a selection input of the bookmark effective to flip back and display the journal page on the first screen.

At block 1608, display a bookmark identifier to identify the journal page that is bookmarked and the location of the bookmark on the first screen. For example, a bookmark identifier 1522 is displayed to identify the journal page 1514 that is bookmarked and the location of the bookmark on the first screen. In an implementation, the bookmark identifier 1522 can be a partial display of the journal page itself that is bookmarked.

Multi-Screen Object-Hold and Page-Change Gesture

Figure 17:
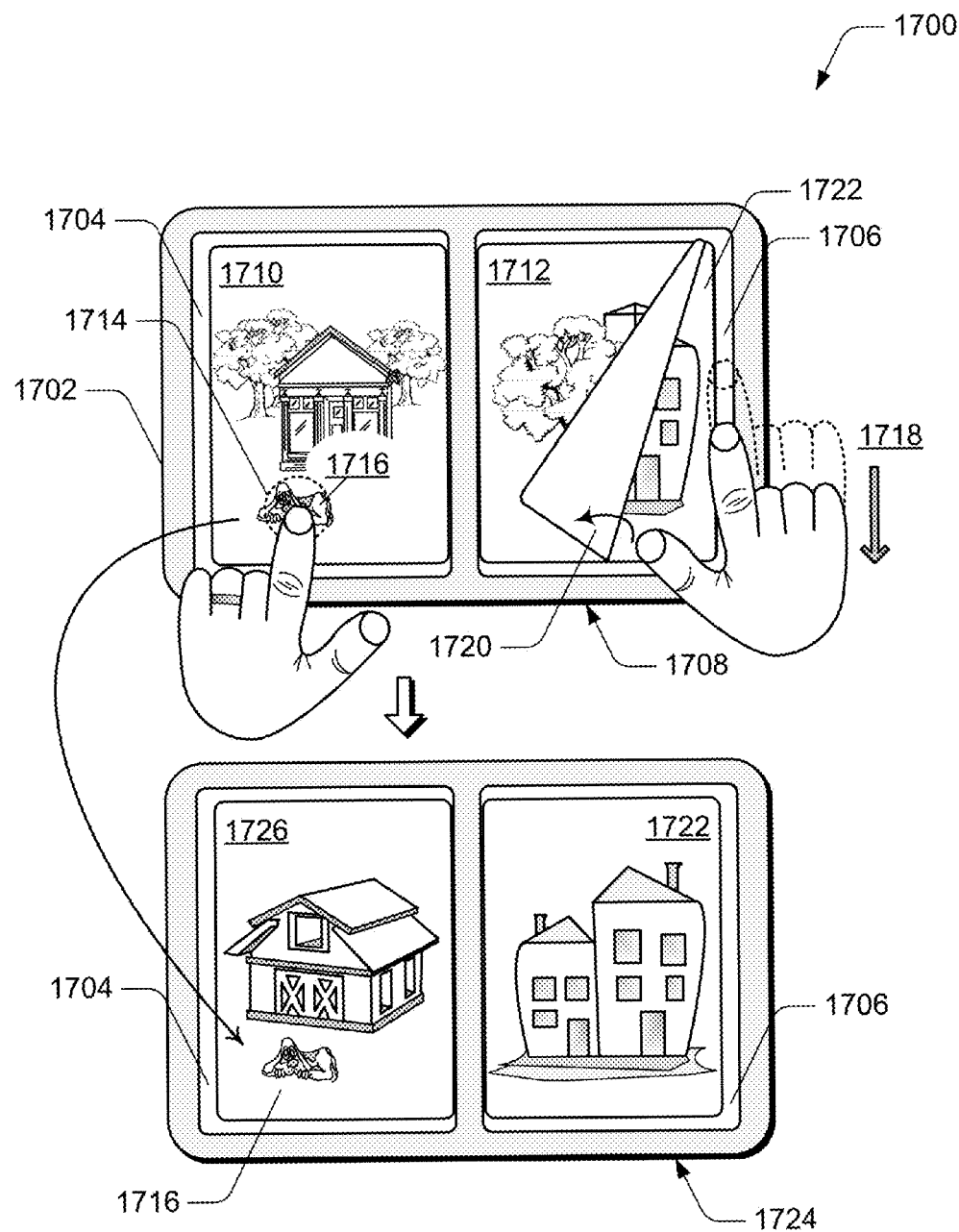
FIG. 17 illustrates an example of a multi-screen object-hold and page-change gesture on a multi-screen system.

FIG. 17 illustrates examples 1700 of a multi-screen object-hold and page-change gesture on a multi-screen system 1702, which in these examples, is shown as a two-screen device. The multi-screen system 1702 may be implemented as any of the various devices described with reference to FIGS. 1 and 2. In this example, the multi-screen system 1702 includes a first screen 1704 and a second screen 1706, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 1702 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen object-hold and page-change gesture can be implemented by a multi-screen system having more than two screens.

A multi-screen object-hold and page-change gesture can be used to move and/or copy a displayed object (or objects) from one display location to another, such as to incorporate a displayed object for display on a journal page. Additionally, a relative display position can be maintained when a displayed object is moved or copied from one display location to another. This can also include a selection of multiple objects that are selected with tap-selection inputs to a series of objects in succession, and then a hold input holds the selection while a motion input is recognized to change journal pages. This gesture can then be determined to move and/or copy all of the held objects to a new journal page that is displayed, while maintaining their relative display position and/or the relative spatial relationship between the objects. Alternatively or in addition, this gesture can include selections of objects that start on one page, then are held while journal pages are flipped, and additional objects from other pages are selected to be added to the selection of objects and carried along with the group.

In the first view 1708 of the multi-screen system 1702, a first journal page 1710 is displayed on the first screen 1704, and a second journal page 1712 is displayed on the second screen 1706. The input recognition system 110 is implemented to recognize a hold input 1714 at the first screen 1704, where the hold input is recognized when held to select a displayed object 1716 on the first screen 1704. The input recognition system 110 can also recognize a motion input 1718 at the second screen 1706, where the motion input is recognized while the displayed object 1716 is selected and the motion input effective to change journal pages at 1720. When the journal pages are changed at 1720, a subsequent journal page 1722 is revealed for display. In an embodiment, the motion input 1518 is recognized at the second screen 1506 along an outer edge of the journal page 1512, and the motion input is effective to flip journal pages at 1520 while the bookmark is maintained for the journal page 1514 on the first screen 1504.

The gesture module 108 is implemented to determine the multi-screen object-hold and page-change gesture from the recognized hold and motion inputs 1714, 1718. The object-hold and page-change gesture can be identified as a cross-screen combination of the hold and motion inputs, and the gesture is effective to move or copy the displayed object 1716 for display on a currently displayed journal page. The second view 1724 of the multi-screen system 1702 illustrates that the displayed object 1716 is moved from journal page 1710 (e.g., or copied from journal page 1710) for display on a currently displayed journal page 1726, which is displayed on the first screen 1704. The displayed object 1716 remains selected while journal pages are changed. The input recognition system 110 can then recognize that the displayed object 1716 is released from the hold input, and the object-hold and page-change gesture is effective to move or copy the displayed object for display on a currently displayed journal page. Additionally, a relative display position of the displayed object can be maintained when the displayed object is moved or copied from one display location to another.

It should be noted that the representations of the hold and motion inputs are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 18:
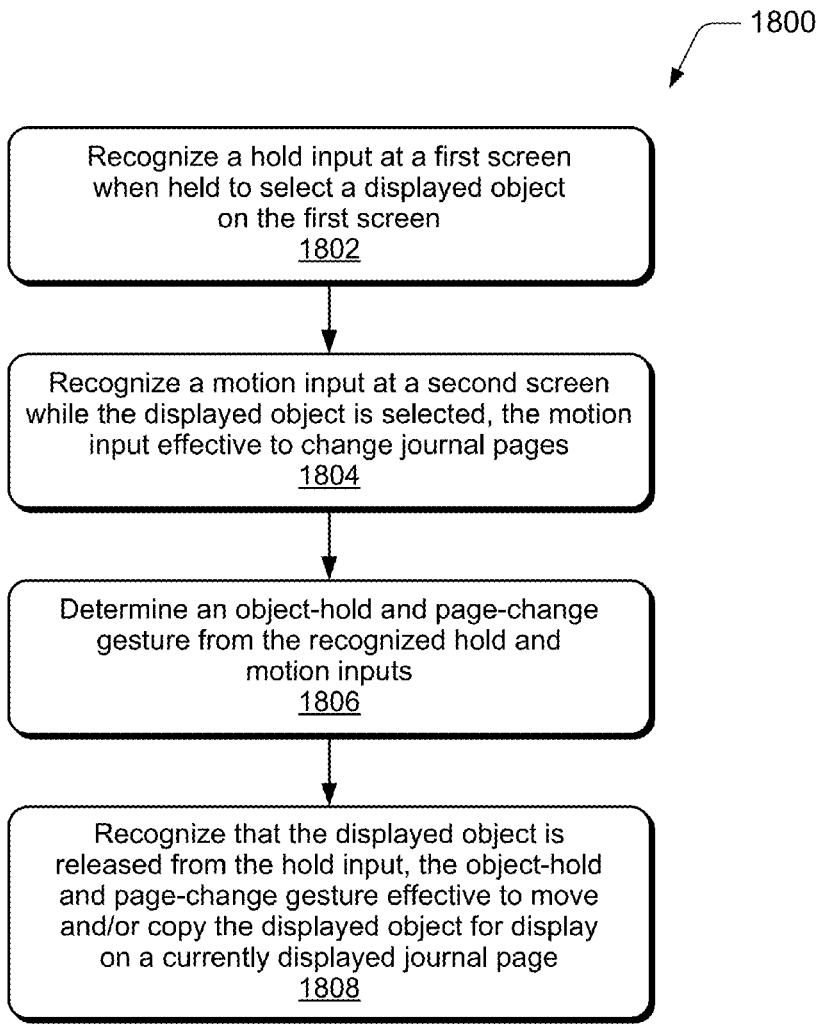
FIG. 18 illustrates example method(s) for a multi-screen object-hold and page-change gesture in accordance with one or more embodiments.

FIG. 18 illustrates example method(s) 1800 of a multi-screen object-hold and page-change gesture. The order in which the method is described is not intended to be construed as a limitation, and any number of the described method blocks can be combined in any order to implement the method, or an alternate method.

At block 1802, a hold input is recognized at a first screen of a multi-screen system, the hold input being recognized when held to select a displayed object on the first screen. For example, the input recognition system 110 recognizes the hold input 1714 at the first screen 1704, and the hold input is recognized when held to select the displayed object 1716 on the first screen 1704. At block 1804, a motion input is recognized at a second screen of the multi-screen system, the motion input being recognized while the displayed object is selected and the motion input effective to change one or more journal pages. For example, the input recognition system 110 also recognizes the motion input 1718 at the second screen 1706, the motion input being recognized while the displayed object 1716 is selected and the motion input effective to change journal pages at 1720.

At block 1806, an object-hold and page-change gesture is determined from the recognized hold and motion inputs. For example, the gesture module 108 determines the multi-screen object-hold and page-change gesture from the recognized hold and motion inputs 1714, 1718. The object-hold and page-change gesture can be identified as a cross-screen combination of the hold and motion inputs. In an embodiment, the object-hold and page-change gesture is effective to initiate a copy and paste function to copy the displayed object 1716 for display on a currently displayed journal page 1726.

At block 1808, the displayed object is recognized when released from the hold input, and the object-hold and page-change gesture effective to move and/or copy the displayed object for display on a currently displayed journal page. For example, the input recognition system 110 recognizes when the displayed object 1716 is released from the hold input, and the object-hold and page-change gesture is effective to move or copy the displayed object for display on a currently displayed journal page. The second view 1724 of the multi-screen system 1702 illustrates that the displayed object 1716 is moved from journal page 1710 (e.g., or copied from journal page 1710) for display on a currently displayed journal page 1726, which is displayed on the first screen 1704. Additionally, a relative display position of the displayed object is maintained when the displayed object is moved or copied from one display location to another. An object-hold and page-change gesture may also be effective to select multiple displayed objects that are moved and/or copied as a group from one display location to another.

Multi-Screen Synchronous Slide Gesture

Figure 19:
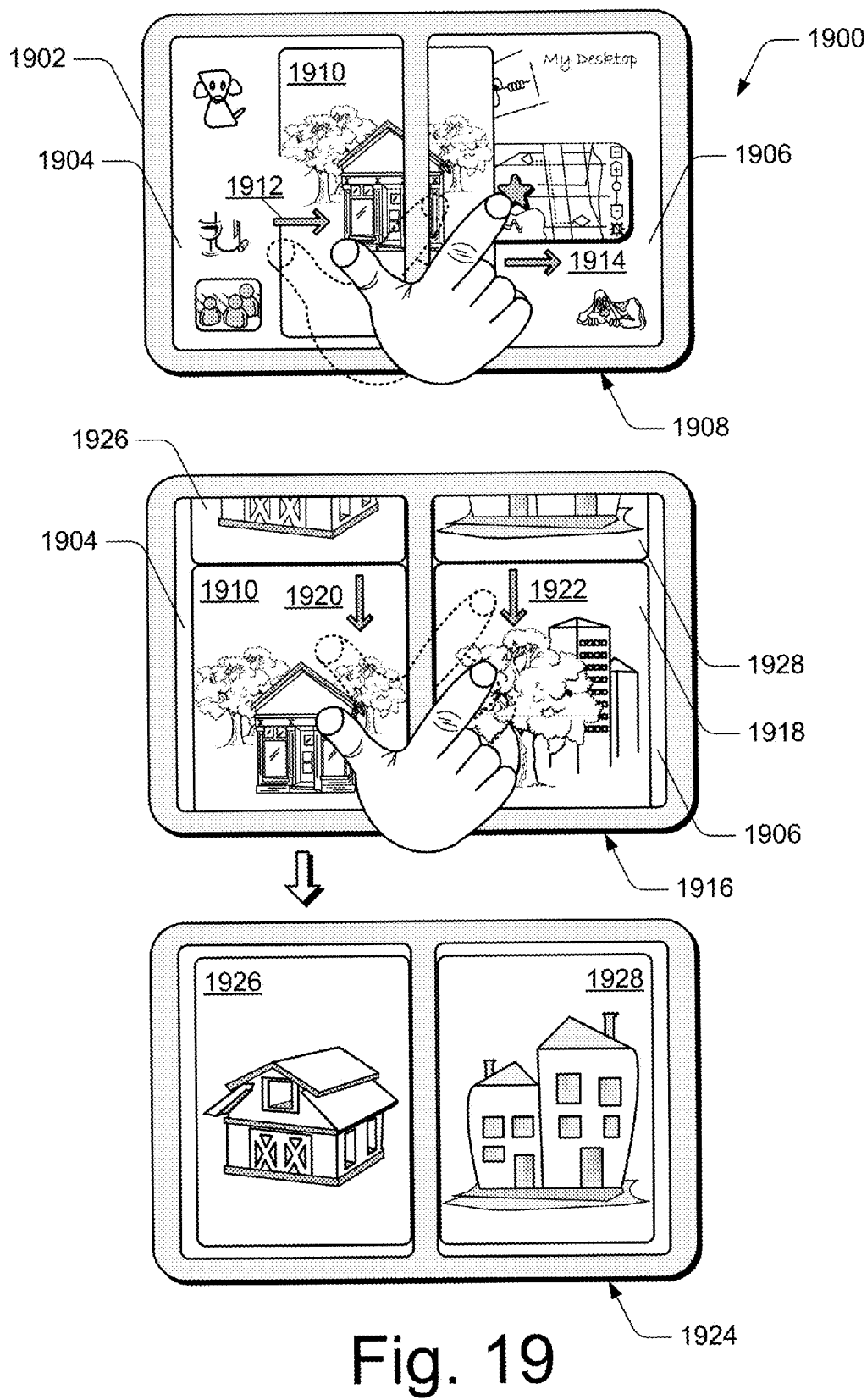
FIG. 19 illustrates an example of a multi-screen synchronous slide gesture on a multi-screen system.

FIG. 19 illustrates examples 1900 of a multi-screen synchronous slide gesture on a multi-screen system 1902, which in these examples, is shown as a two-screen device. The multi-screen system 1902 may be implemented as any of the various devices described with reference to FIGS. 1 and 2. In this example, the multi-screen system 1902 includes a first screen 1904 and a second screen 1906, each implemented to display any type of user interface and various displayable objects (e.g., any type of pictures, images, graphics, text, notes, sketches, drawings, selectable controls, user interface elements, etc.). The screens can also display journal pages, such as any type of notebook, periodical, book, paper, single page, and the like in an electronic form. The multi-screen system 1902 can include a gesture module 108 and an input recognition system 110, as described with reference to the computing device 102 shown in FIG. 1, and may also be implemented with any combination of components as described with reference to the example device shown in FIG. 21. Although the examples are illustrated and described with reference to the two-screen device, embodiments of a multi-screen synchronous slide gesture can be implemented by a multi-screen system having more than two screens.

A multi-screen synchronous slide gesture can be used to move a displayed object from one screen for display on another screen, replace displayed objects on the system screens with different displayed objects, move displayed objects to reveal a workspace on the system screens, and/or cycle through one or more workspaces (e.g., applications, interfaces, etc.) that are displayed on the system screens. A synchronous slide gesture may also be used to navigate to additional views, or reassign a current view to a different screen. Additionally, different applications or workspaces can be kept on a stack and cycled through, forward and back, with synchronous slide gestures.

In the first view 1908 of the multi-screen system 1902, a journal page 1910 is displayed as being moved from the first screen 1904 for display on the second screen 1906. The input recognition system 110 is implemented to recognize a first motion input 1912 at the first screen 1904 when the first motion input moves in a particular direction across the first screen. The input recognition system 110 can also recognize a second motion input 1914 at the second screen 1906 when the second motion input moves in the particular direction across the second screen and approximately when the first motion input is recognized.

The gesture module 108 is implemented to determine the multi-screen synchronous slide gesture from the recognized motion inputs 1912, 1914. The synchronous slide gesture can be identified as a cross-screen combination of the motion inputs, and the gesture is effective to move the journal page 1910 from display on the first screen 1904 to display on the second screen 1906.

In the second view 1916 of the multi-screen system 1902, the first journal page 1910 that is displayed on the first screen 1904 and a second journal page 1918 that is displayed on the second screen 1906 are illustrated as being replaced with different journal pages. The input recognition system 110 can recognize a first motion input 1920 at the first screen 1904 when the first motion input moves in a particular direction across the first screen. The input recognition system 110 can also recognize a second motion input 1922 at the second screen 1906 when the second motion input moves in the particular direction across the second screen and approximately when the first motion input is recognized. The gesture module 108 can determine the multi-screen synchronous slide gesture from the recognized motion inputs 1920, 1922. As shown in the third view 1924 of the multi-screen system 1902, the synchronous slide gesture is effective to move and/or replace the journal pages 1910, 1918 with different journal pages 1926, 1928 for display on the system screens.

It should be noted that the various representations of the motion inputs are merely illustrative for discussion purposes and may or may not appear on the screens of the multi-screen system when described embodiments are implemented. Additionally, any description herein of an input or motion at one screen that may correlate to another input or motion at another screen is applicable to either the first or second screens of the multi-screen system.

Figure 20:
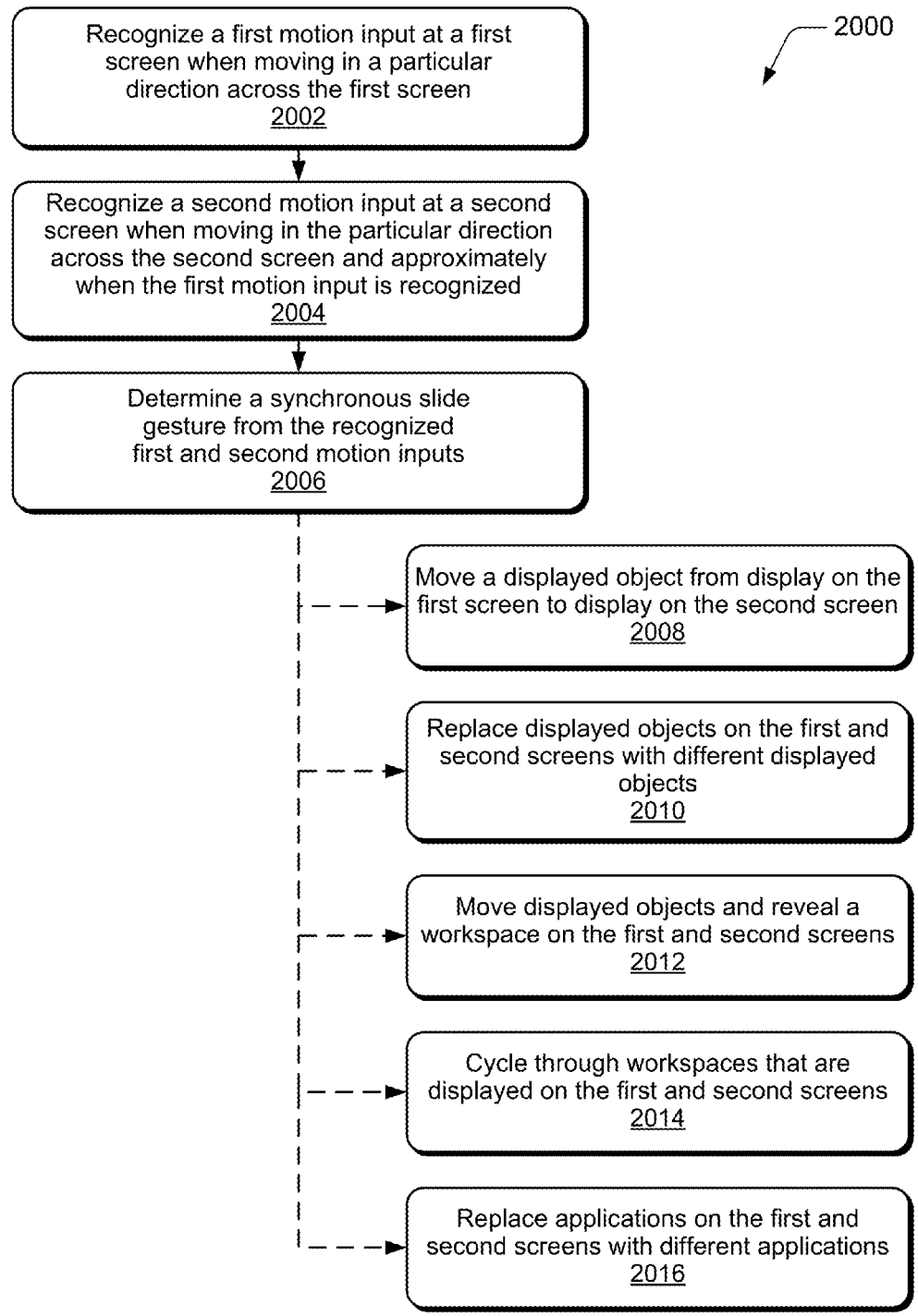
FIG. 20 illustrates example method(s) for a multi-screen synchronous slide gesture in accordance with one or more embodiments.

FIG. 20 illustrates example method(s) 2000 of a multi-screen synchronous slide gesture. The order in which the method is described is not intended to be construed as a limitation, and any number of the described method blocks can be combined in any order to implement the method, or an alternate method.

At block 2002, a first motion input is recognized at a first screen of a multi-screen system when moving in a particular direction across the first screen. For example, the input recognition system 110 recognizes the first motion input 1912 at the first screen 1904 when the first motion input moves in a particular direction across the first screen. At block 2004, a second motion input is recognized at a second screen of the multi-screen system when moving in the particular direction across the second screen and approximately when the first motion input is recognized. For example, the input recognition system 110 also recognizes the second motion input 1914 at the second screen 1906 when the second motion input moves in the particular direction across the second screen and approximately when the first motion input is recognized.

At block 2006, a synchronous slide gesture is determined from the recognized first and second motion inputs. For example, the gesture module 108 determines the multi-screen synchronous slide gesture from the recognized motion inputs 1912, 1914. The synchronous slide gesture is identified as a cross-screen combination of the first and second motion inputs. In various embodiments, the synchronous slide gesture is effective to move a displayed object from display on the first screen to display on the second screen (at block 2008); replace one or more displayed objects on the first and second screens with different displayed objects (at block 2010); move one or more displayed objects and reveal a workspace on the first and second screens (at block 2012); cycle through one or more workspaces that are displayed on the first and second screens (at block 2014); and/or replace one or more applications on the first and second screens with different applications (at block 2016).

Figure 21:
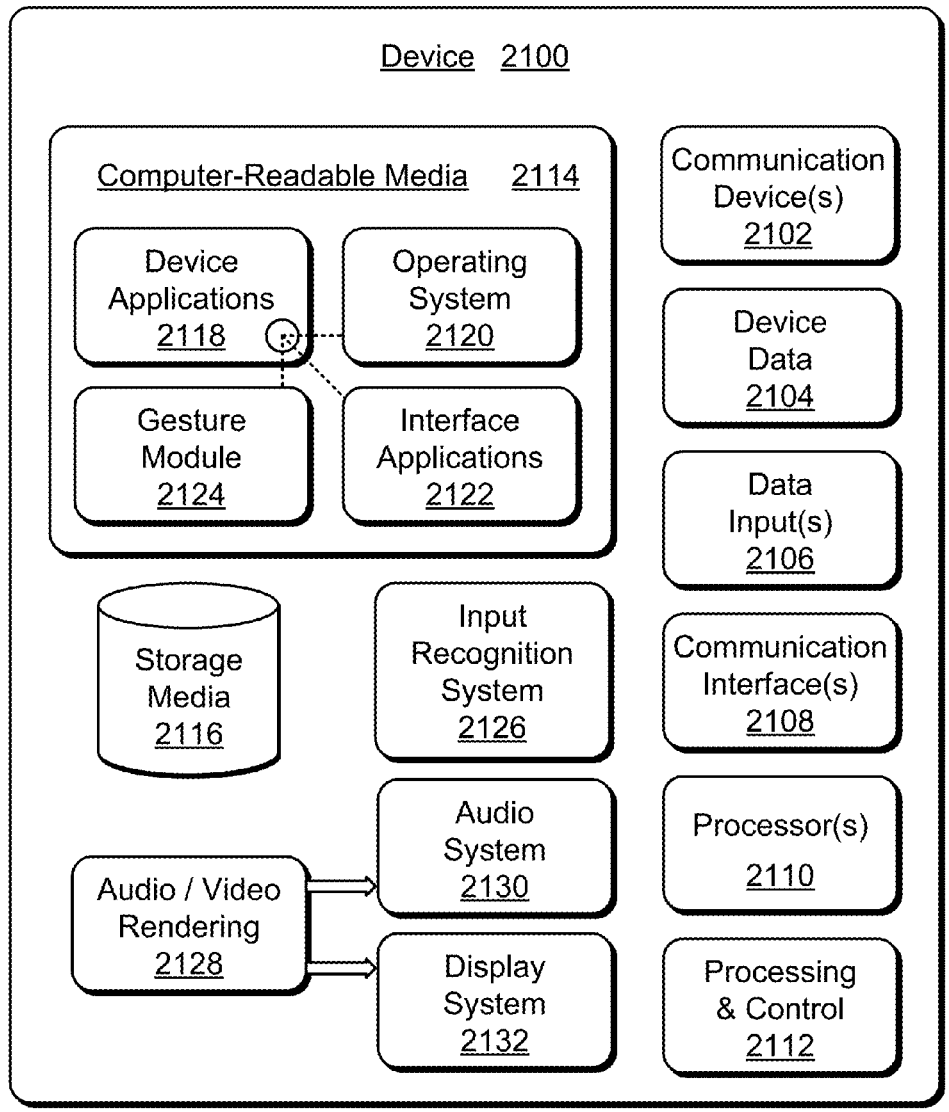
FIG. 21 illustrates components of an example device that can implement various embodiments of multi-screen gestures.

FIG. 21 illustrates various components of an example device 2100 that can be implemented as any type of portable and/or computing device as described with reference to FIGS. 1 and 2 to implement embodiments of multi-screen gestures. In embodiments, device 2100 can be implemented as any one or combination of a wired and/or wireless device, a multi-screen device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 2100 may also be associated with a user (i.e., a person) and/or an entity that operates the device such that a device describes logical devices that include users, software, firmware, and/or a combination of devices.

Device 2100 includes communication devices 2102 that enable wired and/or wireless communication of device data 2104 (e.g., received data, data that is being received, data scheduled for broadcast, data packets of the data, etc.). The device data 2104 or other device content can include configuration settings of the device, media content stored on the device, and/or information associated with a user of the device. Media content stored on device 2100 can include any type of audio, video, and/or image data. Device 2100 includes one or more data inputs 2106 via which any type of data, media content, and/or inputs can be received, such as user-selectable inputs, messages, music, television media content, recorded video content, and any other type of audio, video, and/or image data received from any content and/or data source.

Device 2100 also includes communication interfaces 2108 that can be implemented as any one or more of a serial and/or parallel interface, a wireless interface, any type of network interface, a modem, and as any other type of communication interface. The communication interfaces 2108 provide a connection and/or communication links between device 2100 and a communication network by which other electronic, computing, and communication devices communicate data with device 2100.

Device 2100 includes one or more processors 2110 (e.g., any of microprocessors, controllers, and the like) which process various computer-executable instructions to control the operation of device 2100 and to implement embodiments of multi-screen gestures. Alternatively or in addition, device 2100 can be implemented with any one or combination of hardware, firmware, or fixed logic circuitry that is implemented in connection with processing and control circuits which are generally identified at 2112. Although not shown, device 2100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2100 also includes computer-readable media 2114, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2100 can also include a mass storage media device 2116.

Computer-readable media 2114 provides data storage mechanisms to store the device data 2104, as well as various device applications 2118 and any other types of information and/or data related to operational aspects of device 2100. For example, an operating system 2120 can be maintained as a computer application with the computer-readable media 2114 and executed on processors 2110. The device applications 2118 can include a device manager (e.g., a control application, software application, signal processing and control module, code that is native to a particular device, a hardware abstraction layer for a particular device, etc.).

The device applications 2118 also include any system components or modules to implement embodiments of multi-screen gestures. In this example, the device applications 2118 can include interface applications 2122 and a gesture module 2124, such as when device 2100 is implemented as a multi-screen device. The interface applications 2122 and the gesture module 2124 are shown as software modules and/or computer applications. Alternatively or in addition, the interface applications 2122 and/or the gesture module 2124 can be implemented as hardware, software, firmware, or any combination thereof.

Device 2100 includes an input recognition system 2126 implemented to recognize various inputs or combinations of inputs, such as a select input, hold input, motion input, touch input, tap input, and the like. The input recognition system 2126 may include any type of input detection features to distinguish the various types of inputs, such as sensors, light sensing pixels, touch sensors, cameras, and/or a natural user interface that interprets user interactions, gestures, inputs, and motions.

Device 2100 also includes an audio and/or video rendering system 2128 that generates and provides audio data to an audio system 2130 and/or generates and provides display data to a display system 2132. The audio system 2130 and/or the display system 2132 can include any devices that process, display, and/or otherwise render audio, display, and image data. Display data and audio signals can be communicated from device 2100 to an audio device and/or to a display device via an RF (radio frequency) link, S-video link, composite video link, component video link, DVI (digital video interface), analog audio connection, or other similar communication link. In an embodiment, the audio system 2130 and/or the display system 2132 are implemented as external components to device 2100. Alternatively, the audio system 2130 and/or the display system 2132 are implemented as integrated components of example device 2100.

Although embodiments of multi-screen gestures have been described in language specific to features and/or methods, it is to be understood that the subject of the appended claims is not necessarily limited to the specific features or methods described. Rather, the specific features and methods are disclosed as example implementations of the multi-screen gestures.

The invention claimed is:

1. A computer-implemented method, comprising:
recognizing a hold input at a first screen of a multi-screen system, the hold input being recognized when held at an initial position of the hold input to select a journal page that is displayed on the first screen;
recognizing a motion input at a second screen of the multi-screen system, the motion input being recognized while the hold input remains in place; and
determining a hold and page-flip gesture from the recognized hold and motion inputs, the hold and page-flip gesture effective to maintain the journal page for display on the first screen while one or more additional journal pages are flipped for display on the second screen.

2. A method as recited in claim 1, wherein the hold and page-flip gesture is identified as a cross-screen combination of the hold and motion inputs.

3. A method as recited in claim 1, wherein the hold and page-flip gesture is effective to select the journal page that is displayed on the first screen and flip journal pages to display two additional journal pages, one each displayed on the first and second screens.

4. A method as recited in claim 1, wherein the hold and page-flip gesture is effective to select the journal page that is displayed on the first screen and flip journal pages in a direction of the selected journal page to display two additional journal pages, one each displayed on the first and second screens.

5. A method as recited in claim 1, wherein the hold and page-flip gesture is effective to maintain the display of the journal page that is displayed on the first screen and flip journal pages to display a different journal page on the second screen.

6. A method as recited in claim 1, wherein the hold and page-flip gesture is configurable to at least one of:
select the journal page that is displayed on the first screen and flip journal pages to display two additional journal pages, one each displayed on the first and second screens; or
maintain the display of the journal page that is displayed on the first screen and flip the journal pages to display a different journal page on the second screen.

7. A method as recited in claim 1, wherein the hold and page-flip gesture is effective to maintain the display of the journal page that is displayed on the first screen and flip journal pages to display a non-consecutive journal page on the second screen side-by-side with first journal page.

8. A multi-screen system, comprising:
at least a memory and a processor to implement a gesture module configured to determine a hold and page-flip gesture from recognized hold and motion inputs, the hold and page-flip gesture effective to select a journal page on a first screen while one or more additional journal pages are flipped for display;
an input recognition system configured to:
recognize the hold input at the first screen, the hold input recognized when held at an initial position of the hold input to select the journal page that is displayed on the first screen; and
recognize the motion input at a second screen, the motion input recognized while the hold input remains in place.

9. A multi-screen system as recited in claim 8, wherein the gesture module is further configured to identify the hold and page-flip gesture as a cross-screen combination of the hold and motion inputs.

10. A multi-screen system as recited in claim 8, wherein the hold and page-flip gesture is effective to select the journal page that is displayed on the first screen and flip journal pages to display two additional journal pages, one each displayed on the first and second screens.

11. A multi-screen system as recited in claim 8, wherein the hold and page-flip gesture is effective to select the journal page that is displayed on the first screen and flip journal pages in a direction of the selected journal page to display two additional journal pages, one each displayed on the first and second screens.

12. A multi-screen system as recited in claim 8, wherein the hold and page-flip gesture is effective to maintain the display of the journal page that is displayed on the first screen and flip journal pages to display a different journal page on the second screen.

13. A multi-screen system as recited in claim 8, wherein the hold and page-flip gesture is configurable to at least one of:
select the journal page that is displayed on the first screen and flip journal pages to display two additional journal pages, one each displayed on the first and second screens; or
maintain the display of the journal page that is displayed on the first screen and flip the journal pages to display a different journal page on the second screen.

14. A multi-screen system as recited in claim 8, wherein the hold and page-flip gesture is effective to maintain the display of the journal page that is displayed on the first screen and flip journal pages to display a non-consecutive journal page on the second screen side-by-side with first journal page.

15. A computer-readable storage memory comprising instructions that are executable and, responsive to executing the instructions, a multi-screen system is initiated to:
recognize a hold input at a first screen of the multi-screen system, the hold input recognized when held at an initial position of the hold input to select a journal page that is displayed on the first screen;
recognize a motion input at a second screen of the multi-screen system, the motion input recognized while the hold input remains in place; and
determine a hold and page-flip gesture from the recognized hold and motion inputs, the hold and page-flip gesture effective to maintain the journal page for display on the first screen while one or more additional journal pages are flipped for display on the second screen.

16. The computer-readable storage memory as recited in claim 15, further comprising additional instructions that are executable and, responsive to executing the additional instructions, the multi-screen system is further initiated to identify the hold and page-flip gesture as a cross-screen combination of the hold and motion inputs.

17. The computer-readable storage memory as recited in claim 15, further comprising additional instructions that are executable and, responsive to executing the additional instructions, the multi-screen system is further initiated to flip journal pages to display two additional journal pages in response to the hold and page-flip gesture, one each of the two additional journal pages displayed on the first and second screens.

18. The computer-readable storage memory as recited in claim 15, further comprising additional instructions that are executable and, responsive to executing the additional instructions, the multi-screen system is further initiated to flip journal pages in a direction of the selected journal page to display two additional journal pages in response to the hold and page-flip gesture, one each of the two additional journal pages displayed on the first and second screens.

19. The computer-readable storage memory as recited in claim 15, further comprising additional instructions that are executable and, responsive to executing the additional instructions, the multi-screen system is further initiated to maintain the display of the journal page that is displayed on the first screen and flip journal pages to display a different journal page on the second screen in response to the hold and page-flip gesture.

20. The computer-readable storage memory as recited in claim 15, further comprising additional instructions that are executable and, responsive to executing the additional instructions, the multi-screen system is further initiated to maintain the display of the journal page that is displayed on the first screen and flip journal pages to display a non-consecutive journal page on the second screen side-by-side with first journal page.

* * * * *